United States Patent
Tanaka et al.

(10) Patent No.: US 7,463,586 B2
(45) Date of Patent: Dec. 9, 2008

(54) DATA TRANSFER DEVICE TO TRANSFER REPEAT DATA FROM AN UPPER STATION TO A LOWER STATION

(75) Inventors: Akihiro Tanaka, Moriguchi (JP); Toshiya Mori, Settsu (JP); Hideki Kagemoto, Nara (JP); Koichiro Yamaguchi, Ashiya (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/768,801

(22) Filed: Jun. 26, 2007

(65) Prior Publication Data

US 2007/0253509 A1    Nov. 1, 2007

Related U.S. Application Data

(62) Division of application No. 10/156,168, filed on May 28, 2002, now Pat. No. 7,280,475.

(30) Foreign Application Priority Data

May 28, 2001    (JP) ............................. 2001-159499

(51) Int. Cl.
*H04J 3/14* (2006.01)
(52) U.S. Cl. .................. 370/235; 370/389; 370/428; 725/115; 725/119
(58) Field of Classification Search .................. None
See application file for complete search history.

(56) References Cited

U.S. PATENT DOCUMENTS

| | | | |
|---|---|---|---|
| 6,622,004 B1 | 9/2003 | Sonoda et al. | |
| 6,681,075 B1 | 1/2004 | Waki et al. | |
| 6,782,006 B1 * | 8/2004 | Tanaka et al. | ............... 370/468 |
| 6,871,002 B1 | 3/2005 | Saito | |
| 7,013,479 B2 | 3/2006 | Mori | |
| 7,305,699 B2 * | 12/2007 | Crinon et al. | ............... 725/136 |
| 2001/0037507 A1 | 11/2001 | Mori | |
| 2002/0010936 A1 | 1/2002 | Adam | |
| 2002/0021367 A1 * | 2/2002 | Hirai et al. | ................... 348/473 |
| 2002/0116711 A1 * | 8/2002 | Courtney et al. | ............... 725/50 |
| 2003/0002515 A1 * | 1/2003 | Crinon et al. | ................ 370/412 |
| 2003/0005444 A1 * | 1/2003 | Crinon et al. | ................. 725/50 |
| 2006/0117338 A1 * | 6/2006 | Mori | ........................... 725/25 |

FOREIGN PATENT DOCUMENTS

JP            7-79255         3/1995

(Continued)

*Primary Examiner*—Wing F Chan
*Assistant Examiner*—Brian Roberts

(57) ABSTRACT

A data transfer apparatus receives from an upper station a data stream that includes a plurality of types of repeat data, each type of repeat data being repeatedly transmitted by the upper station, and transfers the repeat data to a lower station, the data transfer apparatus including a storage unit having a storage area; an extraction unit for extracting the types of repeat data from the received data stream; a writing unit for writing the extracted repeat data to the storage area; a data structure ratio determination unit for determining a ratio between the types of repeat data to be output in a data stream per fixed length of time; and a data output unit for reading the repeat data stored in the storage unit, and outputting the read repeat data at the determined ratio.

13 Claims, 25 Drawing Sheets

FOREIGN PATENT DOCUMENTS

| | | |
|---|---|---|
| JP | 11-69321 | 3/1999 |
| JP | 11-346198 | 12/1999 |
| JP | 2000-196542 | 7/2000 |
| JP | 2000-252966 | 9/2000 |
| JP | 2001-86000 | 3/2001 |
| JP | 2001-86088 | 3/2001 |

\* cited by examiner

FIG.3A content data 500

| carousel 450 | carousel 451 |
|---|---|
| PID=100 | PID=101 |

FIG.3B carousel 450

| module 350 | module 351 |
|---|---|
| PID=100<br>module ID=0 | PID=100<br>module ID=1 |

FIG.3C module 350

| section 300 | section 301 | section 302 | ⋯ | section 345 |
|---|---|---|---|---|
| PID=100<br>module ID=0<br>block N=0 | PID=100<br>module ID=0<br>block N=1 | PID=100<br>module ID=0<br>block N=2 | | PID=100<br>module ID=0<br>block N=45 |

FIG.3D section 300

| data packet 250 | data packet 251 | data packet 252 | ⋯ | data packet 273 |
|---|---|---|---|---|
| PID=100<br>module ID=0<br>block N=0<br>(pnum=0) | PID=100<br>module ID=0<br>block N=0<br>(pnum=1) | PID=100<br>module ID=0<br>block N=0<br>(pnum=2) | | PID=100<br>module ID=0<br>block N=0<br>(pnum=23) |

FIG.5

| PID (510) | module ID (520) | previous one second input data packet count (530) |
|---|---|---|
| 100 | 0 | 375 |
|  | 1 | 125 |
| 101 | 0 | 600 |
|  | 1 | 200 |
|  | 2 | 200 |

FIG.6

| PID (610) | module ID (620) | last section block Number (630) | previously-notified block Number (640) |
|---|---|---|---|
| 100 | 0 | L1 | 2 |
| | 1 | L2 | 0 |
| 101 | 0 | L3 | 2 |
| | 1 | L4 | 0 |
| | 2 | L5 | 0 |

FIG.7

| PID 710 | PID multiplex count 720 | PID multiplex accumulated count 730 | moduleID 740 | module multiplex count 750 | module multiplex accumulated count 760 |
|---|---|---|---|---|---|
| 100 | 2 | 4322 | 0 | 8 | 80 |
|  |  |  | 1 | 24 | 120 |
| 101 | 1 | 4323 | 0 | 5 | 85 |
|  |  |  | 1 | 15 | 90 |
|  |  |  | 2 | 15 | 105 |

FIG.8A

| PID | multiplex accumulated count |
|---|---|
| 100 | 0 |
| 101 | 0 |

FIG.8B

| PID | multiplex accumulated count |
|---|---|
| 100 | 2 |
| 101 | 0 |

FIG.8C

| PID | multiplex accumulated count |
|---|---|
| 100 | 2 |
| 101 | 1 |

FIG.8D

| PID | multiplex accumulated count |
|---|---|
| 100 | 2 |
| 101 | 2 |

FIG.9A

| module ID | module multiplex accumulated count |
|---|---|
| 0 | 0 |
| 1 | 0 |
| 2 | 0 |

FIG.9B

| module ID | module multiplex accumulated count |
|---|---|
| 0 | 50 |
| 1 | 0 |
| 2 | 0 |

FIG.9C

| module ID | module multiplex accumulated count |
|---|---|
| 0 | 50 |
| 1 | 150 |
| 2 | 0 |

FIG.9D

| module ID | module multiplex accumulated count |
|---|---|
| 0 | 50 |
| 1 | 150 |
| 2 | 150 |

FIG.13

| PID (510) | module ID (520) | module rate (Kbps) (530) |
|---|---|---|
| 100 | 0 | 375 |
| | 1 | 125 |
| 101 | 0 | 600 |
| | 1 | 200 |
| | 2 | 200 |

FIG.15

| overall output bitrate (Kbps) | PID | PID rate ratio | module ID | module rate ratio |
|---|---|---|---|---|
| 2000 | 100 | 1 | 0 | 2 |
| | | | 1 | 1 |
| | 101 | 2 | 0 | 3 |
| | | | 1 | 1 |
| | | | 2 | 1 |

DATA TRANSFER DEVICE TO TRANSFER REPEAT DATA FROM AN UPPER STATION TO A LOWER STATION

This application is a divisional of U.S. patent application Ser. No. 10/156,168 filed on May 28, 2002 now U.S. Pat. No. 7,280,475.

BACKGROUND OF THE INVENTION (1) Field of the Invention

The present invention relates to a data transfer apparatus used in digital broadcasting to receive content data that is repeatedly transmitted by a data broadcast, and to control transfer of the received content data.

(2) Description of the Related Art

Developments in digital broadcasting in recent years mean that it is becoming common for content data that composes data broadcast programs such as electronic program guides, weather forecasts or news to be multiplexed and broadcast, in addition to video data and audio data that compose broadcast programs.

Such content data is transmitted with a different transmission method to video and audio data. This method is called a DSM-CC (Digital Storage Media Command and Control) carousel transmission method.

This DSM-CC carousel transmission method is defined in international standard ISO/IEC 13818-6 "Part 6: Extensions for Digital Storage Media Command and Control", and refers to a method of transmitting the same data repeatedly in cycles.

In this transmission method, the same data broadcast program is provided repeatedly to viewers, enabling each viewer to extract the content data and view the data broadcast program on demand.

Types of digital broadcasting include BS (Broadcasting Satellite) digital broadcasting and terrestrial digital broadcasting. In terrestrial digital broadcasting, various types of multiplexed data are transmitted with use of special-purpose cables from a central television station (hereinafter "key station") to a local affiliate station (hereinafter "local station"). This enables local station to provide viewers with data broadcast programs in real time.

However, the key station and the local station generally use different data frequency bands for transmission of content data. This gives rise to a problem that when the data frequency band available to the key station is narrower than that available to the local station, if the content data from the key station is output by the local station at the same bitrate at which it is input from the key station, part of the local station's data frequency band is wasted because it is not used in output of content data. A further problem is that when the data frequency band available to the local station is narrower than the data frequency band available to the key station, content data input from the key station cannot be output at the same bitrate at which it is input.

SUMMARY OF THE INVENTION

In view of the above-described problem, the object of the present invention is to provide a data transfer apparatus and a data transfer method that enable reception of content data and transfer of the content data to a lower station with effective use of a local station data frequency band.

Here, lower station denotes an external relay station or reception apparatus.

Here, transfer denotes processing received data and broadcasting or transmitting via cables the resulting data. Processing denotes modifying the transmission rate and the structure ratio of the received data.

In order to realize the stated object the present invention is A data transfer apparatus that receives from an upper station a data stream that includes a plurality of types of repeat data, each type of repeat data being repeatedly transmitted by the upper station, and transfers the repeat data to a lower station, including: a storage unit having a storage area; an extraction unit for extracting the types of repeat data from the received data stream; a writing unit for writing the extracted repeat data to the storage area; a data structure ratio determination unit for determining a ratio between the types of repeat data to be output in a data stream per fixed length of time; and a data output unit for reading the repeat data stored in the storage unit, and outputting the read repeat data at the determined ratio.

According to the stated construction, even if the data frequency band available to the local station is wider than the data frequency band available to the key station, the rate at which repeat data is repeatedly transferred can be adjusted by reading the stored repeat data a number of times necessary according to the difference in the frequency bands. Therefore, full use can be made of the available frequency band, and the repeat data can be transferred effectively at a predetermined structure ratio.

Note that repeat data denotes carousels, modules and so on that compose content data.

Carousel denotes one unit of data that is repeatedly transmitted from the broadcast station according to the DSM-CC carousel transmission method.

Module denotes the smallest unit of data that has significance as information, and is the unit of data that composes a carousel.

Here, the storage area may be composed of a plurality of allocated storage areas, each of which is for storing a different one of the types of repeat data, and each time the extraction unit extracts one of the types of repeat data, the writing unit may overwrite, with the extracted repeat data, repeat data stored in the allocated storage area for the extracted type of repeat data.

According to the stated construction, the size of the memory for storing content data can be reduced, and the newest content data can always be stored. Therefore, even if content data is updated, the updated content data can be promptly transferred and provided to the viewer's reception apparatus.

Here, each of the plurality of types of repeat data may be composed of a plurality of data packets, and the data ratio determination unit may include: a counting sub-unit for counting, for each type of repeat data, the number of data packets extracted over a predetermined length of time, and the data structure ratio determination unit may determine the ratio based on a ratio between the number of data packets counted for each type of repeat data.

According to the stated construction, each type of repeat data can be transferred at the same structure ratio as the structure rate of the repeat data transmitted from the key station, an uniform data broadcast program can be provided to viewers without differences occurring between the key station and the local station in the content of the content data. Furthermore, it is possible to avoid transfer of content data to viewers' reception devices at a structure ratio that is not intended by the key station (for example, repeat data that composes a menu screen for the viewer to select a data broadcast program being transmitted at an extremely low structure ratio).

Furthermore, when the data frequency band available to the local station is wider than the data frequency band available to the key station, the local station can transfer the repeat data at a higher bitrate than that of the key station. As a result, a viewer can view a desired data broadcast program sooner requesting the program than in the case of the key station.

Here, the data stream may further include output information data that includes output ratio information showing a ratio between the types of repeat data output by the upper station, the extraction unit may further extract the output information data, and the data structure ratio determination unit may determine the ratio based on the output ratio information included in the extracted output information data.

According to the stated construction, it is possible to for the key station to adjust in advance the structure ratio of repeat data transferred from the local station. Therefore, the structure ratio of repeat data can be varied according to the frequency with which viewers watch the local station data broadcast program, and repeat data that is viewed frequently can be transferred more frequently.

Here, the output unit may include: an output rate instruction information reception sub-unit for receiving a instruction information for instructing an overall output bitrate and a ratio between the types of repeat data in a data stream output per specified unit of time, the data structure ratio determination unit may include: an instruction information storage sub-unit that has a recording area in which the instruction information is recorded; and an instruction information recording sub-unit for recording the received instruction information in the recording area, the data structure ratio determination unit may determine the ratio based on the recorded instruction information, and the output unit may output the repeat data stored in the storage unit at the overall bitrate shown by the instruction information.

According to the stated construction, an operator at the local station can instruct the structure ratio and the transfer speed of repeat data that is broadcast to viewers' reception apparatuses. Therefore, the operator can choose the information for which there is a high demand in that timeslot, and give high priority to the transfer speed of the repeat data that composes that information, and the operator can also increase the transfer speed of content data in timeslots in which a data broadcast program has a large amount of viewers.

Here, the data stream may further include instruction information data that has (a) instruction information for instructing a ratio between the types of repeat data that are included in a data stream to be output per fixed length of time and (b) an overall output bitrate; the extraction unit may further extracts the instruction information data from the data stream, the data structure ratio determination unit may determines the ratio based on the instruction information included in the extracted instruction information data, and the output unit may output the repeat data stored in the storage unit at the overall bitrate shown by the instruction information.

According to the stated construction, it is possible to for the key station to adjust in advance the structure ratio of repeat data transferred from the local station. Therefore, the structure ratio of repeat data can be varied according to the frequency with which viewers watch the local station data broadcast program, and repeat data that is viewed frequently can be transferred more frequently.

Here, each type of repeat data may be composed of a plurality of data packets that are transmitted according to a carousel transmission method, and the data stream may be a transport stream.

According to the stated construction, even if the data frequency band available to the local station is wider than the data frequency band available to the key station, the rate at which repeat data is repeatedly transferred can be adjusted by reading the stored repeat data a number of times necessary according to the difference in the frequency bands. Therefore, full use can be made of the available frequency band, and the repeat data can be transferred effectively at a predetermined structure ratio.

Here, each of the types of repeat data may have a PID that specifies the type of repeat data, the storage unit may store at least one set of a first PID and a second PID, the first PID identifying a PID that is to be re-written, and the second PID specifying a PID with which the PID identified by the first PID is to be re-written, and the data output unit may include: a judgement sub-unit for judging whether a PID of repeat data to be read by the data output means matches the first PID in the set stored by the storage unit; and a PID re-writing sub-unit for, when the PID of the repeat data to be read matches the first PID, re-writing the PID of the repeat data with the PID specified by the second PID in the set.

According to the stated construction, the PID of data packets having a specified PID is rewritten to a predetermined PID before transmitting the data packets, therefore solving problems that arise when the specified PID is already being used as the PID of a different type of data packets to those sent from the key station.

Furthermore, in order to realize the stated object the present invention is a data transfer apparatus that (a) receives from an upper station (i) a first type of data stream that includes a plurality of types of repeat data, each type of repeat data being repeatedly transmitted by the upper station and being composed of a plurality of repeat data packets, and (ii) a second type of data stream that includes at least one null data packet that is a dummy data packet that does not include data to be reproduced and displayed, and (b) transfers the received repeat data to a lower station, including: a storage unit having a storage area; an extraction unit for extracting the types of the repeat data from the received first data stream; a writing unit for writing the extracted repeat data to the storage area; a detection unit for detecting the null data packet in the received second type of data stream; an output data selection unit for successively selecting one of the types of repeat data to be output; and an output unit for, (c) when the detection unit detects the null data packet, reading from the storage unit a repeat data packet that composes the selected type of repeat data, replacing the detected null data packet with the read data packet, and outputting the resulting data stream, and (d) when the detection unit does not detect a null data packet, outputting the received second data stream.

According to the stated construction, null data packets, which are dummy data packets, are replaced with successively selected data packets that compose repeat data, and the result transferred. As a result, the data transmission efficiency is improved by making effective use of the data frequency band, without transferring unnecessary data.

Here, the storage area may be composed of a plurality of allocated storage areas, each of which is for storing a different one of the types of repeat data, and each time the extraction unit extracts one of the types of repeat data, the writing unit may overwrite, with the extracted repeat data, repeat data stored in the allocated storage area for the extracted type of repeat data.

According to the stated construction, the size of the memory for storing content data can be reduced, and the newest content data can always be stored. Therefore, even if content data is updated, the updated content data can be promptly transferred and provided to the viewer's reception apparatus.

Here, the output data selection unit may include: a counting sub-unit for counting, for each type of repeat data, the number of data packets extracted over a predetermined length of time, and the output data selection unit may successively selects a type of repeat data to be output, in compliance with a determined priority order based on a ratio between the number of data packets counted for the types of repeat data.

According to the stated construction, each type of repeat data can be transferred at the same structure ratio as the structure rate of the repeat data transmitted from the key station, an uniform data broadcast program can be provided to viewers without differences occurring between the key station and the local station in the content of the content data. Furthermore, it is possible to avoid transfer of content data to viewers' reception devices at a structure ratio that is not intended by the key station (for example, repeat data that composes a menu screen for the viewer to select a data broadcast program being transmitted at an extremely low structure ratio).

Here, the repeat data may be composed of a plurality of data packets that are transmitted according to a carousel transmission method, and each of the first type and second type of data streams may be a transport stream.

According to the stated construction, null data packets, which are dummy data packets, are replaced with successively selected data packets that compose repeat data, and the result transferred. As a result, the data transmission efficiency is improved by making effective use of the data frequency band, without transferring unnecessary data.

Here, the second type of data stream may include data packets, each data packet having one of a plurality of types of PIDs, the plurality of types of PIDs including a first PID; the storage unit may store a second PID; the detection unit may further detect a data packet having the first PID in the received second type of data stream, and the output unit may further, when the detection unit detects the data packet having the first PID, read the second PID from the storage unit, overwrite the first PID of the detected data packet with the second PID, and output the resulting data packet.

According to the stated construction, the PID of data packets having a specified PID is rewritten to a predetermined PID before transmitting the data packets, therefore solving problems that arise when the specified PID is already being used as the PID of a different type of data packets to those sent from the key station.

Furthermore, in order to realize the stated object the present invention is a data transfer apparatus that receives from an upper station a data stream that includes pieces of repeat data that are repeatedly transmitted by the upper station, and transfers the received repeat data to a lower station, including: a storage unit having a storage area for storing one piece of the repeat data; an extraction unit for successively extracting the pieces of repeat data at a time from the received data stream; a writing unit for writing the extracted piece of repeat data to the storage area, and, each time the extraction unit newly extracts one of the pieces of repeat data, overwriting the piece of repeat data stored in the storage area with the newly-extracted piece of repeat data; and an output unit for reading the piece of repeat data stored in the storage unit, and outputting the read piece of repeat data.

Furthermore, the present invention is a data transfer apparatus that receives from an upper station a data stream that includes pieces of repeat data that are repeatedly transmitted by the upper station, and transfers the received repeat data to a lower station, each piece of repeat data being updated at a predetermined interval and including update information showing that the updated piece of repeat data has been updated, including: a storage unit having a storage area for storing one piece of the repeat data; an extraction unit for successively extracting the pieces of repeat data from the received data stream; an update judgement unit for judging, based on the update information, whether the extracted piece of repeat data has been updated; a writing unit for writing a first extracted piece of repeat data to the storage area, and, only when one of the extracted pieces of repeat data is judged to have been updated, replacing the updated piece of repeat data with the piece of repeat data stored in the storage unit; and an output unit for reading the piece of repeat data stored in the storage unit, and outputting the read piece of repeat data.

According to the stated constructions, even if the data frequency band available to the local station is wider than the data frequency band available to the key station, the rate at which repeat data is repeatedly transferred can be adjusted by reading the stored repeat data a number of times necessary according to the difference in the frequency bands. Therefore, full use can be made of the available frequency band, and the repeat data can be transferred effectively at a predetermined structure ratio. Furthermore, the size of the memory for storing content data can be reduced.

Furthermore, even when the data frequency band available to the local station is narrower than the data frequency available to the key station, since it is not necessary to temporarily accumulate a large amount of data in the memory in order to adjust the transfer rate, repeat data can be transferred to the lower station without use of a large memory.

In addition the newest content data can always be stored. Therefore, even if content data is updated, the updated content data can be promptly transferred and provided to the viewer's reception apparatus.

Furthermore, in order to realize the stated object the present invention is a data transfer method, a recording medium having a program recorded thereon, and a program used in a data transfer apparatus that (a) receives from an upper station a data stream that includes a plurality of types of repeat data, each type of repeat data being repeatedly transmitted by the upper station, (b) transfers the repeat data to a lower station, and (c) has a storage area, the method, the program recorded on the recording medium, and the program including: an extraction step for extracting the types of repeat data from the received data stream; a writing step for writing the extracted repeat data to the storage area; a data structure ratio determination step for determining a ratio between the types of repeat data to be output in a data stream per fixed length of time; and a data output step for reading the repeat data stored in the writing step, and outputting the read repeat data at the determined ratio.

According to the stated method, recording medium, and program, even if the data frequency band available to the local station is wider than the data frequency band available to the key station, the rate at which repeat data is repeatedly transferred can be adjusted by reading the stored repeat data a number of times necessary according to the difference in the frequency bands. Therefore, full use can be made of the available frequency band, and the repeat data can be transferred effectively at a predetermined structure ratio. Furthermore, in order to realize the stated object the present invention is a data transfer method, recording medium having a program recorded thereon, and a program for use in a data transfer apparatus that (a) receives from an upper station (i) a first type of data stream that includes a plurality of types of repeat data, each type of repeat data being repeatedly transmitted by the upper station and being composed of a plurality of repeat data packets, and (ii) a second type of data stream that includes at least one null data packet that is a dummy data packets that does not include data to be reproduced and displayed, (b) transfers the received repeat data to a lower station, and (c) has a storage area, the method, the program recorded on the recording medium, and the program including: an extraction step for extracting the types of the repeat data from the received first data stream; a writing step for writing the extracted repeat data to the storage area; a detection step for detecting the null data packet in the received second type of data stream; an output data selection step for successively selecting one of the types of repeat data to be output; and an output step for, (d) when the detection step detects the null data packet, reading from the storage area a repeat data packet that composes the selected type of repeat data, replacing the detected null data packet with the read data packet, and outputting the resulting data stream, and (e) when the detection step does not detect a null data packet, outputting the received second data stream.

According to the stated method, program recorded on the recording medium, and the program, null data packets, which are dummy data packets, are replaced with successively selected data packets that compose repeat data, and the result transferred. As a result, the data transmission efficiency is improved by making effective use of the data frequency band, without transferring unnecessary data.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIGS. 3A to 3D show the relationship between data packets, sections, modules, carousels and content data;

FIG. 5 is a table showing one example of an input data packet count counted by a extracted data counting unit 103 for each module ID;

FIG. 6 is a table showing one example of a management information table;

FIG. 7 shows parameters used by the data structure ratio determination unit 104 for performing data structure ratio determination process;

FIGS. 8A to 8D show examples of PID multiplex accumulated count tables held by a data structure ratio determination unit 104;

FIGS. 9A to 9D show examples of module multiplex accumulated count tables held by a data structure ratio determination unit 104;

FIG. 13 shows one example of output bitrate information;

FIG. 15 is s table showing one example of instruction information;

DESCRIPTION OF THE PREFERRED EMBODIMENTS

The following describes embodiments of the present invention with use of the drawings.

First Embodiment

<Structure>

Figure 1:
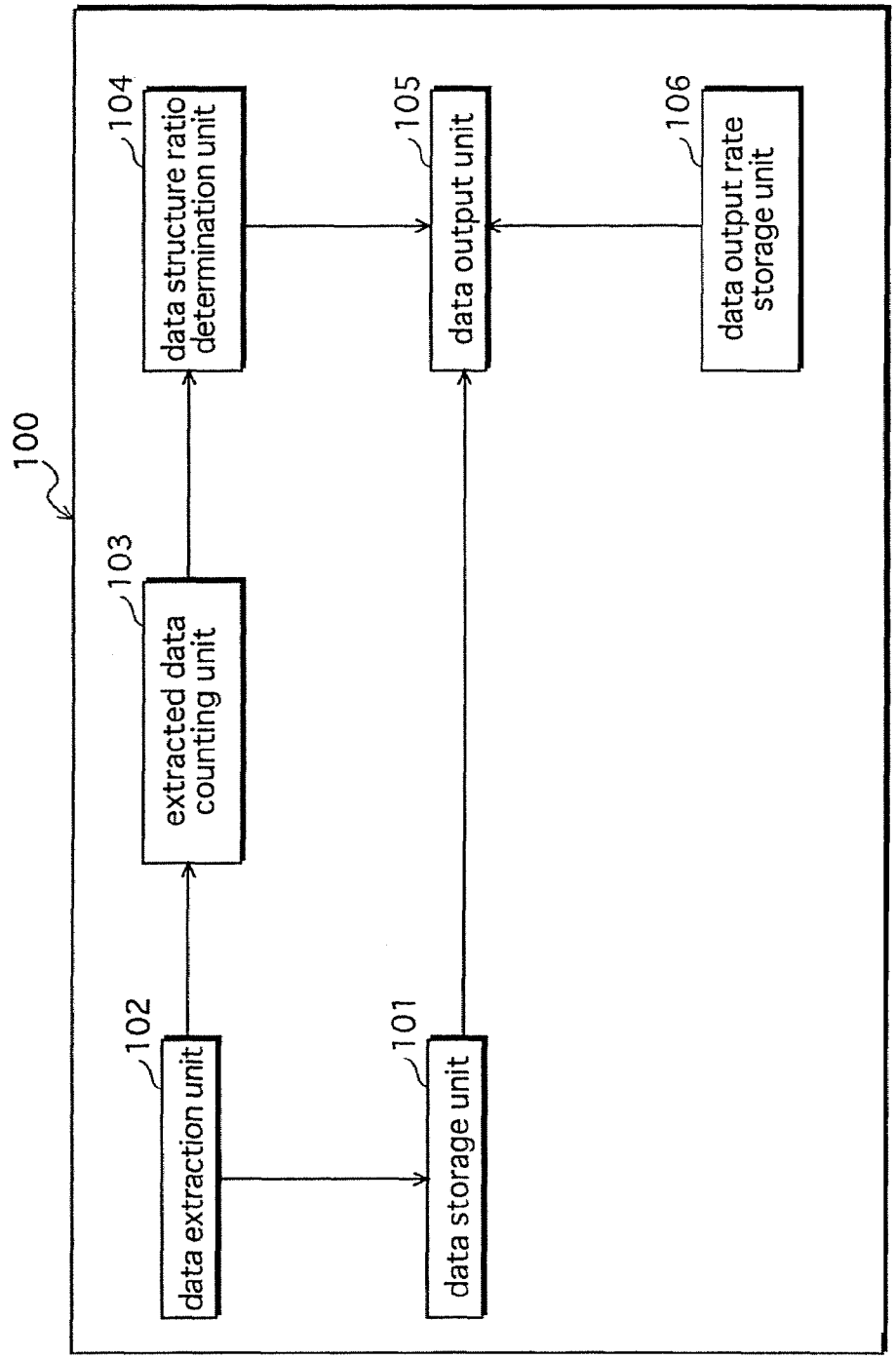
FIG. 1 shows the structure of the principal components of the data transfer apparatus 100 in an embodiment of the present invention.

FIG. 1 shows the structure of the principal components of a data transfer apparatus 100 in an embodiment of the present invention. The data transfer apparatus 100 is composed of a data storage unit 101, a data extraction unit 102, an extracted data counting unit 103, a data structure ratio determination unit 104, a data output unit 105, and a data output rate storage unit 106.

The hardware of the data transfer apparatus 100 includes a CPU (central processing unit), a ROM (read-only memory), a RAM (random access memory), a hard disk, a decoder, and a filter. Computer programs are stored in the ROM or the hard disk, and the data transfer apparatus 100 achieves its functions according to operations of the CPU in accordance with the computer programs. This is the same for a data transfer apparatus 200, a data transfer apparatus 300, a data transfer apparatus 400, a data transfer apparatus 500, and a data transfer apparatus 600 that are described later.

The data storage unit 101 includes a RAM and a hard disk, and stores content data that has been extracted by the data extraction unit 102. Specifically, content data, which is composed of modules, is stored in module units in storage areas allocated to each module (hereinafter "allocated storage area(s)"). Note that modules will be described later.

Figure 2:
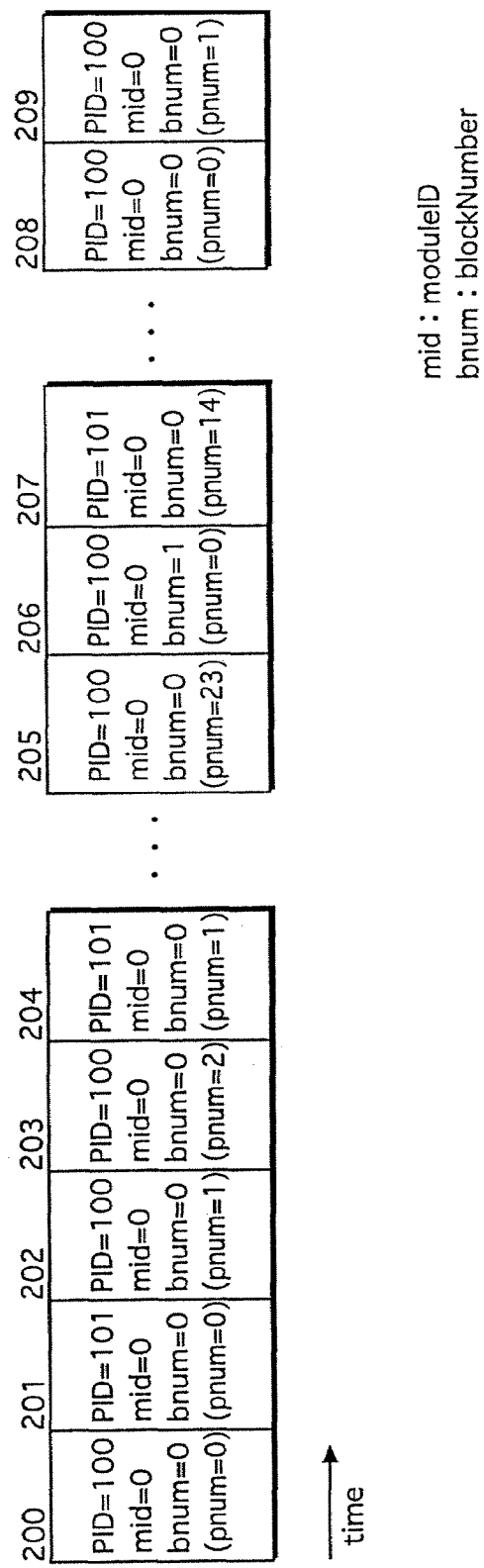
FIG. 2 shows the form of content data transmitted from a broadcast station according to DSM-CC carousel transmission method.

FIG. 2 is a visual representation of content data transmitted from a broadcast station according to the DSM-CC carousel transmission method. The content data is transmitted in packets, as shown by packets 200 to 209 in FIG. 2. Each data packet has a fixed length of 188 bytes. Each data packet is identified by a PID, a module ID, and a block Number incorporated therein, or by its place in the order in which the data packets are transmitted.

Here, the PID is an identifier for distinguishing carousels and types of data packets. The PID is used, for example, to identify each carousel and video data that compose the content data.

The module ID identifies each module in a carousel.

The block Number identifies each section in a module.

Section denotes a unit of data unit in a module.

The following describes the relationship between data packets, sections, modules, carousels and content data. This relationship is shown in FIGS. 3A to 3D.

FIGS. 3A, 3B, 3C, and 3D respectively show content data composed of a plurality of carousels 450 and 451, a carousel composed of a plurality of modules 350 and 351, a module composed of a plurality of sections 300 to 345, and a section composed of a plurality of data packets 250 to 273.

Note that "pnum" in brackets in FIG. 3D is a number given for convenience here to each data packet to show the order of the data packets in the section. In reality, the data packets are not given a number, but are identified by their position in a transmitted section of packet data.

Note also that in FIGS. 2 and 3, each data packet has a module ID and a block Number appended thereto (this does not comply with MPEG2 specifications). However, it is possible to append a module ID and a block Number only to the head data packet in each section, in compliance with MPEG specifications. In this case, the module ID and the block Number of each data packet, excluding head data packets, are specified based on the order in which the data packets are transmitted.

Figure 4:
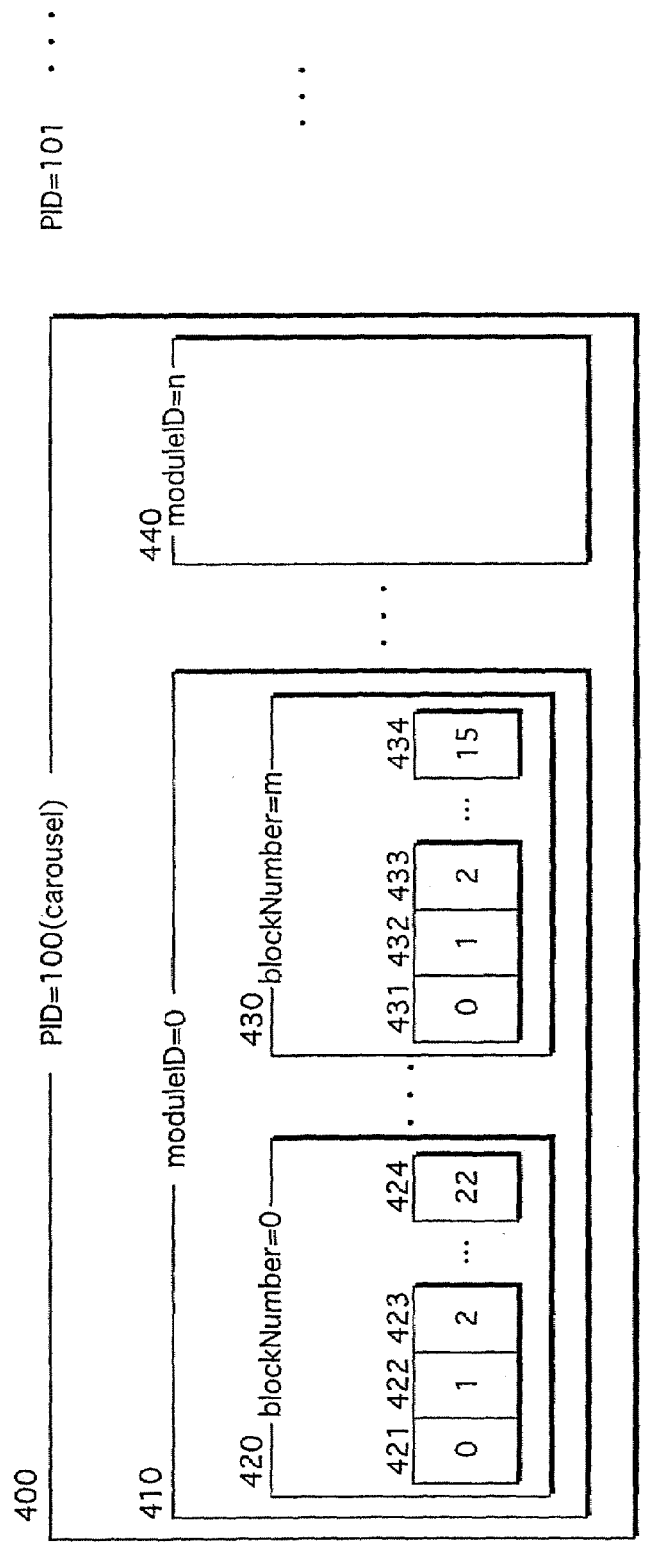
FIG. 4 shows schematically an example of the structure of content data stored in a data storage unit 101.

FIG. 4 shows schematically an example of the structure of content data stored in the data storage unit 101. As shown in FIG. 4, content data is stored by PID, module ID and block number. Specifically, the data packets in content data (hereinafter "content data packet") are sorted according to PID, content data packets having the same PID are further sorted according to module ID, and those having the same module ID are then further sorted according to block number.

For example, the content data packets having a PID 100 are sorted based on their respective module IDs into modules 410 to 440, and further sorted within the respective module based on their block numbers into sections (for example, sections 420 to 430 in the module 410). Furthermore, each section stores content data packets that belong to that section. Specifically, content data packets 421 to 424 are stored in the section 420, and content data packets 431 to 434 are stored in the section 430.

The data extraction unit 102, which includes a transport stream decoder, receives and then decodes a transport stream (hereinafter "TS") that includes content data transmitted from an external apparatus, sets the PID and the module ID of the modules belonging to the PID as filter conditions, and filters them from the decoded data. Then, the data extraction unit 102 extracts one module of content data packets at a time, and stores each extracted module in the data storage unit 101 in the respective allocated storage area.

Here, when there is already a carousel stored in the data storage unit 101 that has the same PID as a newly-extracted carousel, the data storage unit 102 overwrites the already-stored carousel with the newly-extracted carousel. This results in the newly-extracted carousel being stored.

The extracted data counting unit 103 counts, for each module, the number of content data packets that are received by the data extraction unit 102 over a specified length of time (hereinafter "input data packet count"), and outputs the input data packet count to the data structure ratio determination unit 104.

FIG. 5 is a table showing one example of input data packet counts counted by the extracted data counting unit 103 for each module ID. A PID column 510 shows the PID of the received content data packets. Here there are two types of PID: 100 and 101.

A module ID column 520 shows the module ID of the received content data packets. Here, the carousel with the PID 100 is composed of two modules having module IDs 0 and 1 respectively, and the carousel with the PID 101 is composed of three modules having module IDs 0, 1 and 2 respectively.

A previous one second input packet count column 530 shows the input data packet count counted for each module ID. For the carousel having the PID 100, the module ID 0 has an input data packet count of 375, and the module ID 1 has an input data packet count of 125. For the carousel having the PID 101, the module ID 0 has an input data packet count of 600, the module ID 1 has an input data packet count of 200, and the module ID 2 has an input data packet count of 200.

The data structure ratio determination unit 104 determines, based on the input data packet count for each module input by the extracted data counting unit 103, a carousel structure ratio and a module structure ratio. The carousel structure ratio denotes a ratio between each type of carousel of content data packets to be output per specified length of time. The module structure ratio denotes a ratio between each type of module of content data packets to be output per specified length of time. The data structure ratio determination unit 104 selects a section of content data packets to be successively output, so as to conform to the carousel structure ratio and the module structure ratio, and notifies the data output unit 105 of the section that is to be output.

Specifically, the data structure ratio determination unit 104 calculates a ratio of the input data packet count of the carousels (hereinafter "PID ratio"), and a ratio of the input data packet count of the modules in the carousel (hereinafter "module ratio"). The data structure ratio determination unit 104 determines the carousel structure ratio based on the calculated PID ratio, and determines the module structure ratio in the carousel to be output based on the module ratio. Then, the data structure ratio determination unit 104 determines the sections to be successively output based on an order of arrangement of the sections in the module, and notifies the data output unit 105 of sections to be output.

Note that the reason that the content data packets to be successively output are determined in sections is that the MPEG (Motion Picture Experts Group) 2 specification does not allow a mixture of content data packets that have the same PID but belong to different sections to be output together.

Taking the example in FIG. 5, the PID ratio of the carousel having the PID 100 and the carousel having the PID 101 is 1:2. Therefore, the data structure ratio determination unit 104 successively determines the section to be output so that the carousel structure ratio of the carousel having the PID 100 and the carousel having the PID 101 is 1:2.

Furthermore, in the process for successively determining the output target section, the module ratio of the carousel with the PID 100 is 3:1. Therefore, the data structure ratio determination unit 104 successively determines the section to be output from among the sections belonging to each module ID so that the module structure ratio of the module having the module ID 0 and the module having the module ID 1 is 3:1. Furthermore, the module ratio of the carousels having the PID 101 is 3:1:1. Therefore, the data structure ratio determination unit 104 successively determine the section to be output from among the sections belonging to each module ID so that the module structure ratio of the module having the module ID 0, the module having the module ID 1, and the module having the module ID 2 is 3:1:1. Then, the data structure ratio determination unit 104 notifies the data output unit 105 of the section successively selected to be output.

Here, the data structure ratio determination unit 104 has a management information table that shows the correspondence. between the PID of each carousel, the module ID of each module in the carousel, the block Numbers of each section in each module and the block Number of each section to be output that was most recently notified (hereinafter "previously-notified (section)" denotes a (section) that was most recently notified to the data output unit 105). The data structure ratio determination unit 104 uses the management information table to determine each section to be successively output.

FIG. 6 shows one example of a management information table. A PID column 610 shows the PID of each carousel. A module ID column 620 shows the module ID of each module in the carousel. A last section block Number column 630 shows a block number of the last section of each module. A previously-notified block Number column 640 shows the block Number of the section that is to be output that has been most recently notified to the data output unit 105. For example, when the data structure ratio determination unit 104 selects the module having a module ID 0 and a PID 100 as the output target module, it obtains "2", which is the corresponding previously-notified block Number, and compares the obtained block Number and the last section block Number L1 of the same module. When 2 is smaller than L1, the data structure ratio determination unit 104 selects the section having the next block number in the module, here the block Number 3, as the output target section, notifies the PID, module ID and block number of the selected section to the data output unit 105, and updates the corresponding previously-notified block Number column 640 to "3".

On the other hand, when 2 is not smaller than L1, the data structure ratio determination unit 104 selects the first section in the module (the section having a block number 0) as the output target section, notifies the PID, module ID and block Number of the selected section to the data output unit 105, and updates the corresponding previously-notified block Number in the previously-notified block Number column 640 to 0.

Note that the information in the PID column 610, the module ID column 620 and the last section block Number 630 in the management information table may be set in advance. Alternatively, the information in these columns may be pre-incorporated in transmitted content data packets (for example, as the head content data packet in the carousel of each PID). In this case the data structure ratio determination unit 104 obtains this information through the data extraction unit 102.

FIG. 7 shows parameters used by the data structure ratio determination unit 104 for determining output target PIDs and output target sections. A PID column 710 shows the PID of each carousel. A PID multiplex count column 720 shows a PID multiplex count for each PID. A PID multiplex accumulated count column 730 shows a PID multiplex accumulated count for each PID. A module ID column 740 shows a module ID for each module in each carousel. A module multiplex count column 750 shows a module multiplex count for each module ID. A module multiplex accumulated count column 760 shows a module multiplex accumulated count for each module ID.

The data structure ratio determination unit 104 calculates the PID multiplex count and the PID multiplex accumulated count for each PID, and the module multiplex count and the module multiplex accumulated count for each module ID.

Here, PID multiplex count is a value set to be an inverse ratio of the PID ratio. For example, taking the example in FIG. 5, the PID ratio of the carousels with the respective PIDs 100 and 101 is 1:2. This ratio expressed as an inverse ratio is, as shown in FIG. 6, 2:1. It is satisfactory to set the value of the PID multiplex count so that it is the inverse ratio of the PID ratio. For example, if the PID multiplex count of the carousel with the PID 100 is set not to 2 but to 1, the PID multiplex count of the carousel with the PID 101 would be set to 0.5 rather than 1.

The PID multiplex accumulated count is a parameter for determining an output target PID in an output target PID and section determination process described later. The PID multiplex accumulated count is updated each time an output target section in a carousel of a PID is determined, by adding the PID multiplex count of the particular PID to an initial value of the PID multiplex count.

FIGS. 8A to 8D show examples of the PID multiplex accumulated count tables held by the data structure ratio determination unit 104. FIG. 8A shows the initial state of each PID multiplex accumulated count. The data structure ratio determination unit 104 makes the carousel with the PID 100 the output target (alternatively the carousel with the PID 101 may be made the output target), and determines an output target section in the output target carousel. Then, the data structure ratio determination unit 104 adds a multiplex count 2 to the multiplex accumulated count of the PID 100, resulting in an updated PID multiplex accumulated count table shown in FIG. 8B.

Next, the data structure ratio determination unit 104 makes the carousel having the PID 101 the output target, since it has the lower PID multiplex accumulated count value in the updated PID multiplex accumulated count table, and determines an output target section in the output target carousel. Then, the data structure ratio determination unit 104 adds a multiplex count 1 to the multiplex accumulated count of the PID 101, resulting in an updated multiplex accumulated count table shown in FIG. 8C. The data structure ratio determination unit 104 further repeats the stated processing to repeatedly update the PID multiplex accumulated count table.

The module multiplex count is a value set to be an inverse ratio of the module ratio. For example, using the example in FIG. 5, the module ratio of the modules in the carousel with the PID 100 is 3:1. This ratio expressed as an inverse ratio is, as shown in FIG. 7, 1:3. It is satisfactory to set the value of the module multiplex count so that it is the inverse ratio of the module ratio. For example, if the module multiplex count of the module with the module ID 0 in the carousel having the PID 100 is set not to 8 but to 1, the module multiplex count of the module with the module ID 1 would be set to 3 rather than 24.

The module multiplex accumulated count is a parameter for determining an output target section in an output target section determination process described later. The module multiplex accumulated count is updated each time an output target section is determined, by adding to an initial value of the module multiplex count a value that is the module multiplex count value multiplied by the number of content data packets in the output target section (hereinafter "multiplex count multiplied value").

FIGS. 9A to 9D show examples of the module multiplex accumulated count tables held by the data structure ratio determination unit 104. FIG. 9A shows the initial state of the multiplex accumulated count of each of the module IDs 0 to 2 in the carousel having the PID 101. The data structure ratio determination unit 104 makes the module having the module ID 0 the output target (alternatively either of the other modules may be made the output target), and determines an output target section in the output target module. Then, the data structure ratio determination unit 104 adds a module multiplex count multiplied value 50, which is obtained by multiplying the module multiplex count value 5 by the number of content data packets in the output target section (for simplicity it is supposed that there are 10 packets in each section), to the module multiplex accumulated count of the module having the module ID 0, resulting in an updated module multiplex accumulated count table shown in FIG. 9B. Note that the module multiplex count multiplied values are calculated using the module multiplex count values of the modules having the PID 101 in the example in FIG. 7 as the module multiplex counts (5 for the module having the module ID 0, 15 for the module having the module ID 1, and 15 for the module having the module ID 15). In the same way, the module multiplex count multiplied values for the module ID 1 and the module ID 2 are calculated.

Next, the data structure ratio determination unit 104 makes the module having the module ID 1 that has the (equal) lowest module multiplex accumulated count value in the updated module multiplex accumulated count table the output target (alternatively the module having the module ID 2 may be made the output target), and determines an output target section in the output target module. Then the data structure ratio determination unit 104 adds a module multiplex count multiplication value of 150 to the module multiplex accumulated count of the module having module ID 1, resulting in an updated multiplex accumulated count table shown in FIG. 9C. The data structure ratio determination unit 104 further repeats the stated processing to repeatedly update the module multiplex accumulated count table.

Note that the output target PID determination process and output target section determination process performed by the data structure ratio determination unit 104 is described later.

The data output unit 105, which has a memory for storing the content data packets to be output, reads the content data packets in the section to be output from the data storage unit 101, based on the PID, module ID and block Number of the output target section notified by the data structure ratio determination unit 104. Then the data output unit 105 writes the read content data packets in the order in which they are arranged in the section to the memory as a queue, and outputs the content data packets in the order in which they were written at the overall bitrate stored in the data output rate storage unit 106.

As a result, the overall bitrate is distributed among the carousels and modules to correspond to the carousel structure rate and the module structure rate determined by the data structure ratio determination unit 104, and the structure ratio among carousels and modules output per specified length of time is determined.

Here, overall bitrate denotes a bitrate set in advance by an operator at which all content data packets are output.

Furthermore, output denotes broadcasting or transmitting via cables.

The data output rate storage unit 106 stores this overall bitrate.

<Operations>

The following describes operations in the output target PID and output target section determination process performed by the data structure ratio determination unit 104.

Figure 10:
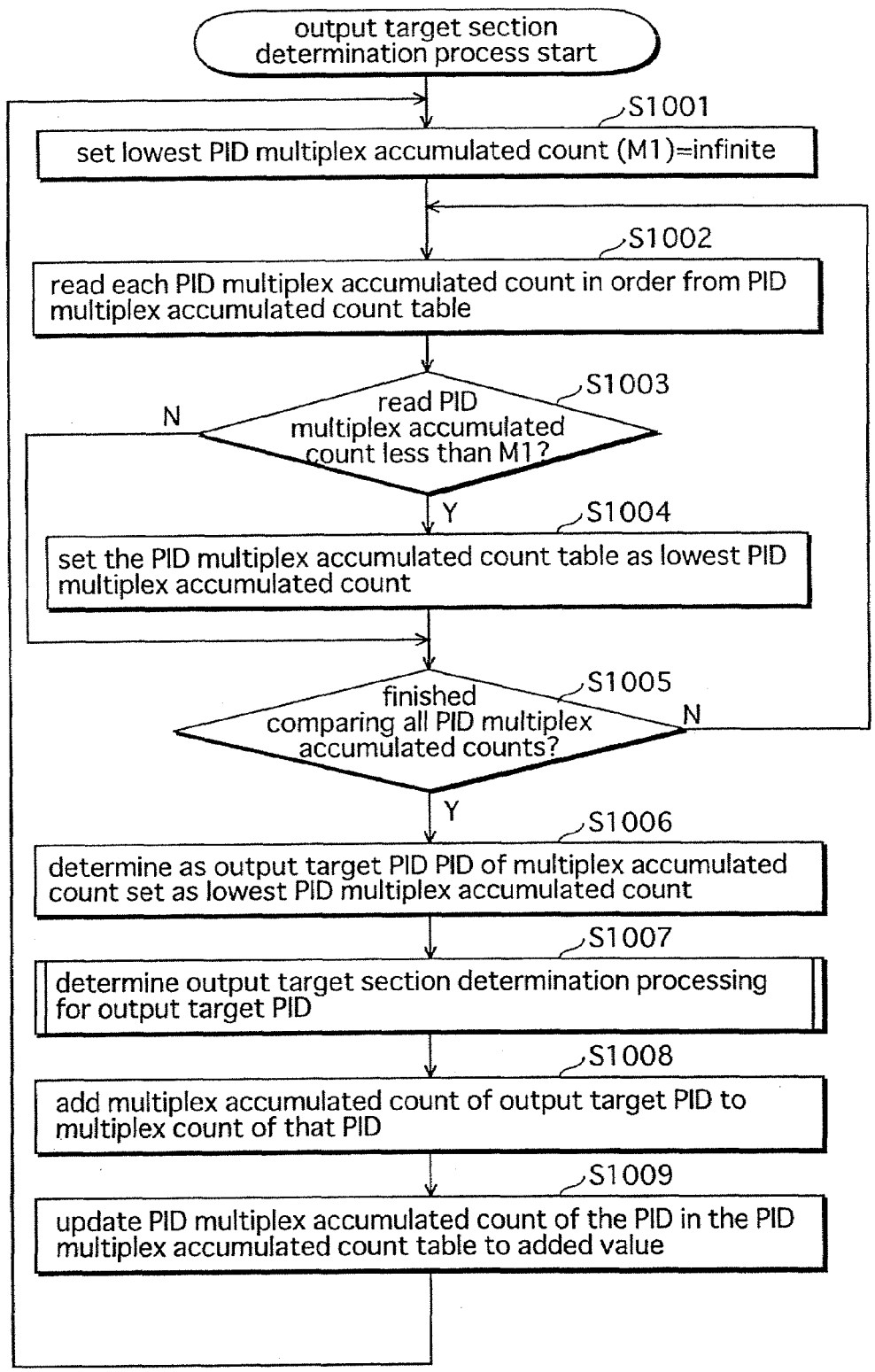
FIG. 10 is a flowchart showing output target section determination process performed by the data structure ratio determination unit 104.

FIG. 10 is a flowchart showing the output target section determination process performed by the data structure ratio determination unit 104. The output target PID determination process is included in the above process. The data structure ratio determination unit 104 sets a lowest PID multiplex accumulated count (M1) showing the lowest PID multiplex accumulated count value to an initial value of infinite (step S1001), reads the PID multiplex accumulated counts in order from the PID multiplex accumulated count table (step S1002), and compares each read PID multiplex accumulated count to M1 (step S1003).

When the PID multiplex accumulated count is lower than M1 (step S1003:Y), the data structure ratio determination unit 104 sets that PID multiplex accumulated count to the lowest PID multiplex accumulated count (M1) (step S1004), and judges whether all the read PID multiplex accumulated counts have been compared to M1 (step s1005).

When all have been compared (step S1005:Y), the data structure ratio determination unit 104 selects the PID showing the PID multiplex accumulated count value set as the lowest PID multiplex accumulated count (M1) as the output target PID (step S1006), and determines an output target section (the processing at step S1007 is described later). Then, the data structure ratio determination unit 104 adds the PID multiplex count of the output target PID to the PID multiplex accumulated count of that PID. (step S1008), and updates the value of the PID multiplex accumulated count of the PID with the value obtained at step S1008 (step S1009). The data structure ratio determination unit 104 repeats the processing from step S1001 to step S1009.

When the PID multiplex accumulated count is not lower than M1 at step S1003 (step S1003:N), the data structure ratio determination unit 104 performs the processing at step S1005.

When the comparison of all the read PID multiplex accumulated counts to Ml has not finished at step S1005 (step S1005:N), the data structure ratio determination unit 104 repeats the processing from step S1002 to step S1005.

Figure 11:
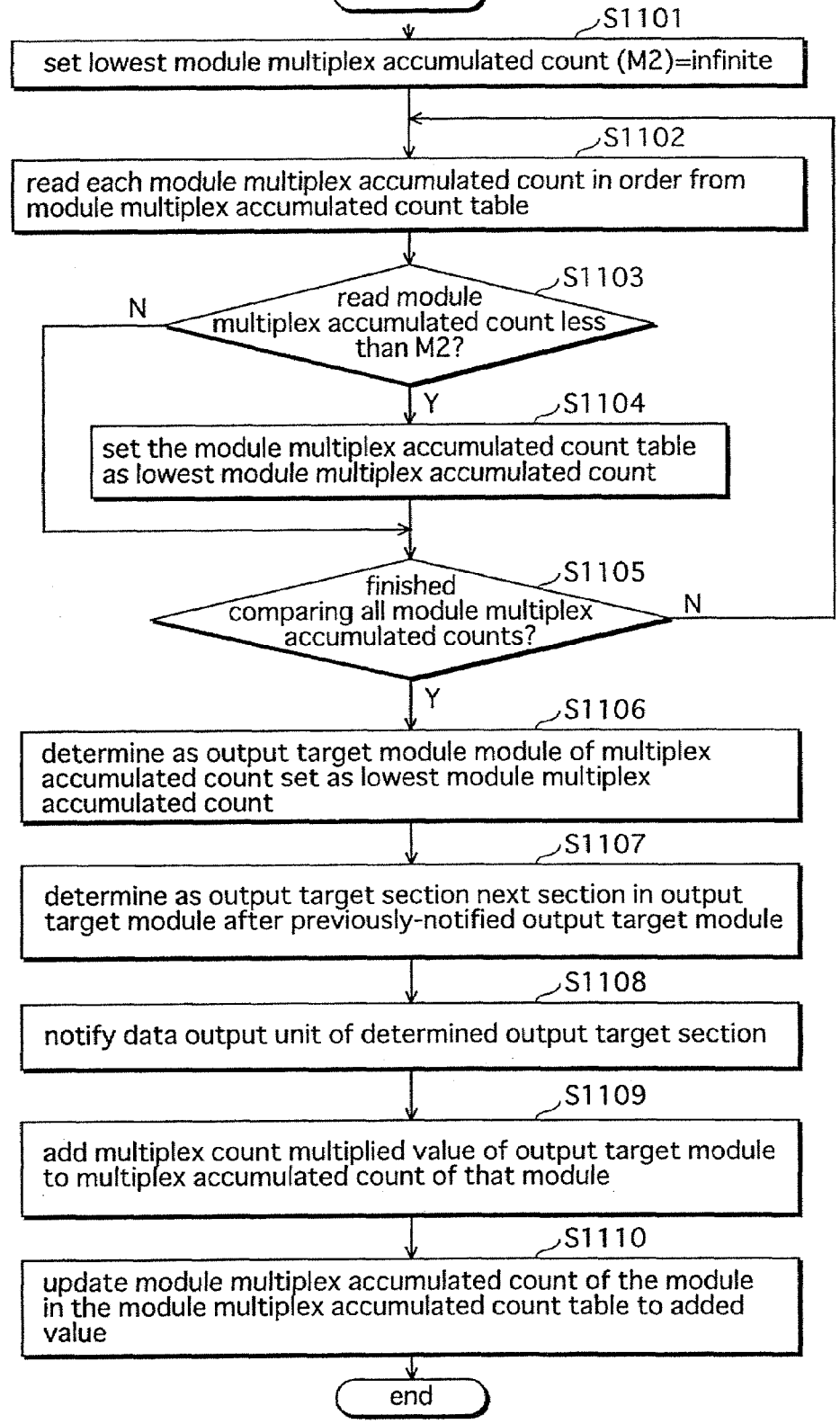
FIG. 11 is a flowchart showing processing performed by the data structure ratio determination unit 104 at step 1007.

FIG. 11 is a flowchart showing the processing performed by the data structure ratio determination unit 104 at step S1007.

On determining an output target PID at step S1006, the data structure ratio determination unit 104 sets a lowest module multiplex accumulated count (M2) showing the lowest module multiplex accumulated count value to an initial value of infinite (step S1101), reads the module multiplex accumulated counts in order from the module multiplex accumulated count table (step S1102), and compares each read PID multiplex accumulated count to M2 (step S1103).

When the module multiplex accumulated count is lower than M2 (step S1103:Y) the data structure ratio determination unit 104 sets that multiplex accumulated count as the lowest module multiplex accumulated count (M2) (step S1104), and judges whether all the read module multiplex accumulated counts have been compared to M2 (step S1105).

When all have been compared (step S1105:Y), the data structure ratio determination unit 104 selects the module showing the module multiplex accumulated count value set as the lowest module multiplex accumulated count (M2) as the output target module (step S1106). Then, by referring to the management information table, the data structure ratio determination unit 104 selects the next section in the selected output target module after the previously-notified section as the output target section. Here, if there is no previously-notified section, or if the previously-notified section is the last section in the output target module, the first section in the module is selected as the output target section (step S1107). The data structure ratio determination unit 104 notifies the determined output target section to the data output unit 105 (step S1008, the content data packet output process performed by the data output unit 105 after receiving notification is described later). The data structure ratio determination unit 104 adds the module multiplex count multiplied value of the output target module to the module multiplex accumulated count of the module (step S1109), updates the value of the module multiplex accumulated count of the module with the value obtained at step S1108 (step S1110), and perform the processing at step S1008 in FIG. 10.

At step S1103, when the module multiplex accumulated count is not lower than M2 (step S1103:N), the data structure ratio determination unit 104 performs the processing at step S1105.

At step S1105, when the comparison of all the read module multiplex accumulated counts to M2 has not finished (step S1105:N), the data structure ratio determination unit 104 repeats the processing from steps S1102 to S1105.

The following describes content packet data output process performed by the data output unit 105 after receiving notification of the output target section from the data structure ratio determination unit 104.

Figure 25:
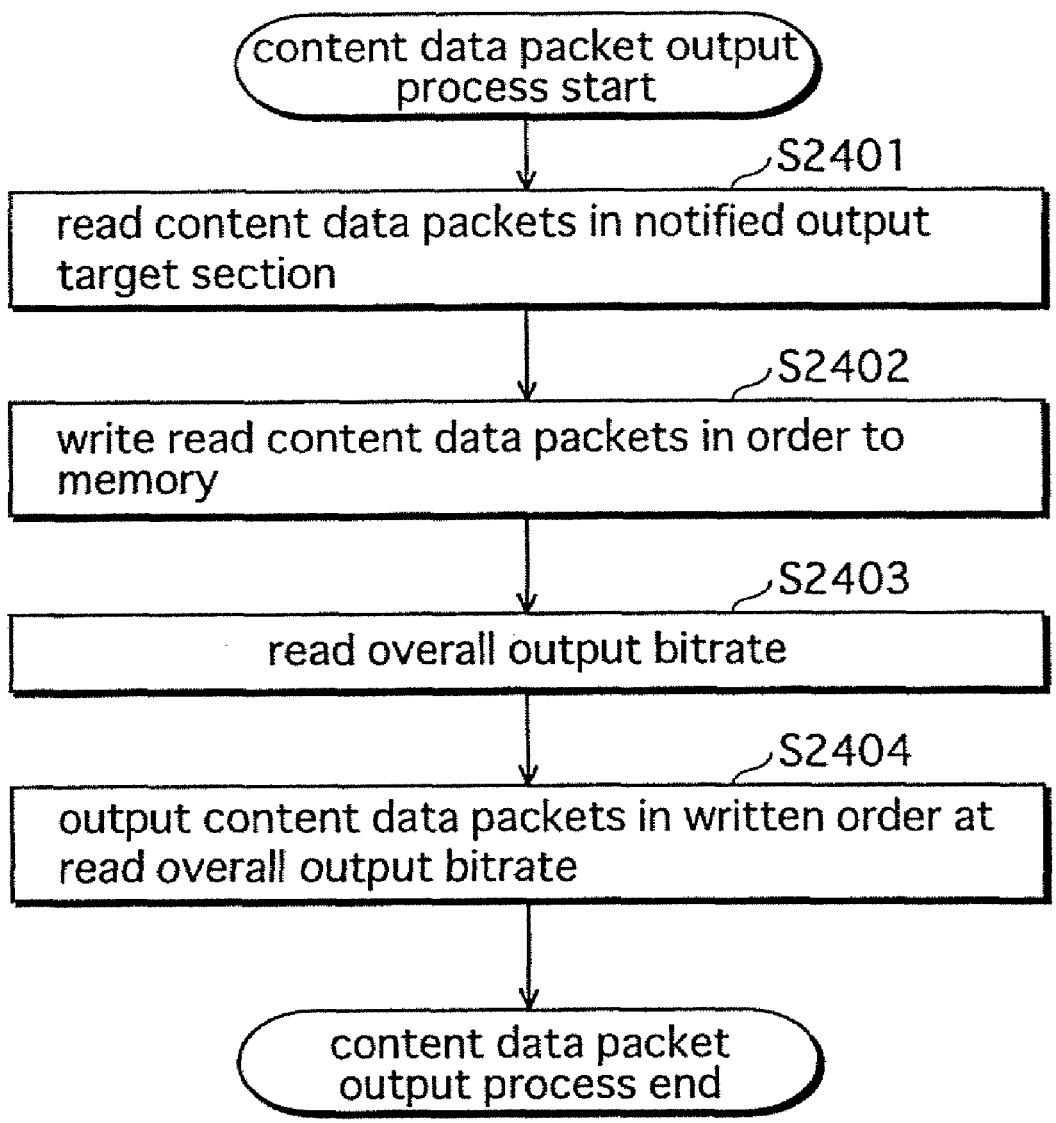
FIG. 25 is a flowchart showing a content data packet output process performed by a data output unit 105.

FIG. 25 is a flowchart showing the content data packet output process performed by the data output unit 105.

The data output unit 105 reads the data packets included in the output target section, based on the PID, module ID, and block Number notified from the data structure ratio determination unit 104 set at S1108 in FIG. 11, from the data storage unit 101 (step S2401). Then, the data output unit 105 writes the read content data packets to the memory as a queue in the order that the content data packets are arranged in the section (step S2402), reads the overall bitrate stored in the data output rate storage unit 106 (step S2403), and outputs the written content data packets in the order in which they were written, at the read overall bitrate (step S2404).

According to the above-described processes, content data packets belonging to each carousel and each module are written to and output from the memory, distributed according to the carousel comparison ratio and the module comparison ratio determined by the data structure ratio determination unit 104 in compliance with the PID ratio and the module ratio. Therefore, each carousel and each module is distributed according to the carousel structure ratio and the module structure ratio determined by the data structure ratio determination unit 104 in compliance with the PID ratio and the module ratio, and the structure ratio between each carousel and between each module to be output per specified length of time is determined.

Second Embodiment

In the data transfer apparatus 100 in the first embodiment, the input data packet count is obtained by the extracted data counting unit 103, and the carousel structure ratio and the module structure ratio are determined based on the obtained input data packet count. However, a data transfer apparatus 200 in the present embodiment obtains output bitrate information from a TS transmitted by an external apparatus, and determines the carousel structure ratio and the module structure ratio based on the obtained output bitrate information.

Here, output bitrate information denotes information showing an output bitrate distributed among modules.

Figure 12:
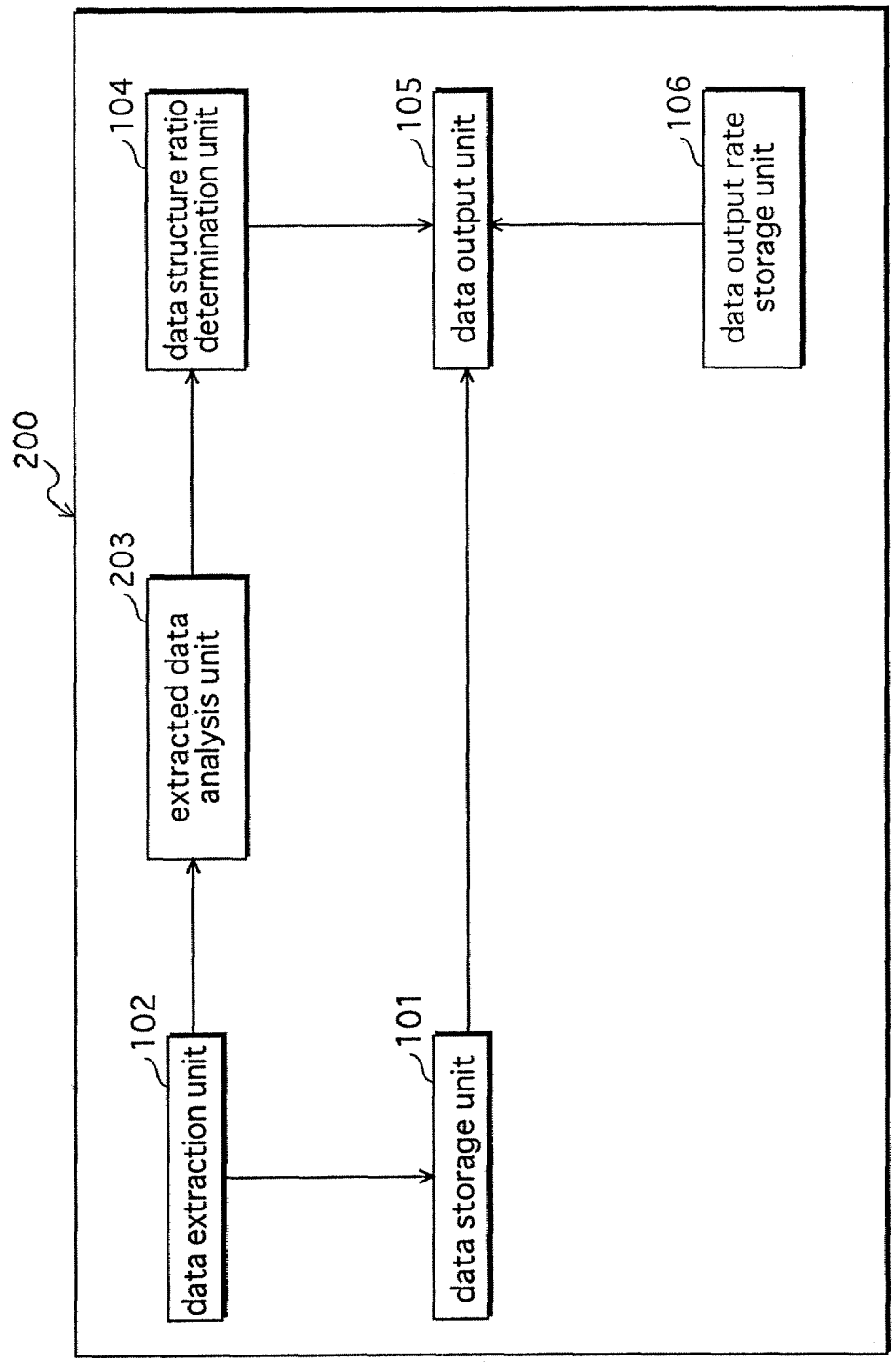
FIG. 12 shows the structure of the principal components of a data transfer apparatus 200.

FIG. 12 shows the structure of the principal components of the data transfer apparatus 200 in an embodiment of the present invention. The data transfer apparatus 200 is composed of the data storage unit 101, the data extraction unit 102, an extracted data analysis unit 203, the data structure ratio determination unit 104, the data output unit 105, and the data output rate storage unit 106.

Note that structural elements of the data transfer apparatus 200 that are the same as those in the data transfer apparatus 100 shown in FIG. 1 have the same numbering. The following describes the structural elements in the data transfer apparatus 200 that differ from the data transfer apparatus 100.

In the present embodiment, the output bitrate information is transmitted embedded in a TS as data packets having attached output information identifiers.

FIG. 13 shows one example of the output bitrate information.

A PID column 510 shows PIDs of carousels that are output. Here two types of such PIDs are shown: 100 and 101.

A module ID column 520 shows module IDs of modules that are output. The carousel having the PID 100 is composed of two types of modules whose respective module IDs are 0 and 1. The carousel having the PID 101 is composed of three types of modules whose respective module IDs are 0, 1 and 2.

A module ID column 530 shows an output bitrate allocated to the module of each module ID. For the carousel having the PID 100, the output bitrate is 375 Kbps (kilobits per second) for the module having the module ID 0, and 125 Kbps for the module having the module ID 1. For the carousel having the PID 101, the output bitrate is 600 Kbps for the module having the module ID 0, 200 Kbps for the module having the module ID 1, and 200 Kbps for the module having the module ID 2.

The data extraction unit 102 extracts data packets that have an output information identifier from the TS, and outputs the extracted data packets to the extracted data analysis unit 203.

The extracted data analysis unit 203 obtains output bitrate information from the data packets input by the 102, and outputs the obtained output bitrate information to the data structure ratio determination unit 104.

The data structure ratio determination unit 104 determines the carousel structure ratio and the module structure ratio based on the input output bitrate information, determines content data packets to be successively output in section units so as to comply with the determined carousel structure ratio and the module structure ratio, and notifies each determined output target section to the data output unit 105.

Since the operations in the output target PID determination process and the output target section determination process performed by the data structure ratio determination unit 104 are the same as those in the first embodiment a description is omitted here.

Third Embodiment

Figure 14:
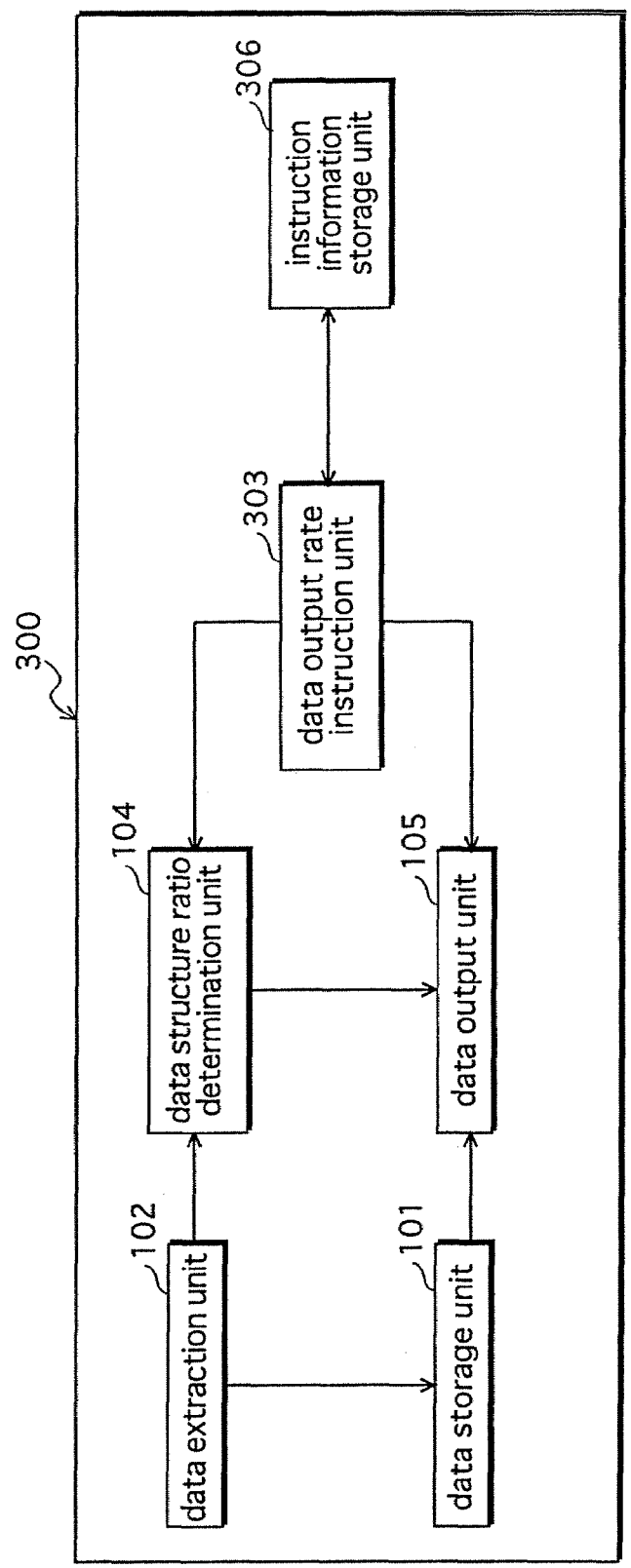
FIG. 14 shows the structure of the principal components of a data transfer apparatus 300.

FIG. 14 shows the structure of the principal components of a data transfer apparatus 300 in an embodiment of the present invention. The data transfer apparatus 300 is composed of the data storage unit 101, a data extraction unit 102, the data structure ratio determination unit 104, the data output unit 105, a data output rate instruction unit 303, and an instruction information storage unit 306.

Note that structural elements of the data transfer apparatus 300 that are the same as those in the data transfer apparatus 100 shown in FIG. 1 have the same numbering. The following describes the structural elements in the data transfer apparatus 300 that differ from the data transfer apparatus 100.

The data output rate instruction unit 303 receives inputs of the overall bitrate, a PID rate ratio, and a module rate ratio from an operator, and has these inputs stored in the instruction information storage unit 306. Then, the data output rate instruction unit 303 instructs the data output unit 105 to output content data at the input overall bitrate, and notifies the data structure ratio determination unit 104 of the input PID rate ratio and module rate ratio.

Here, PID rate ratio denotes the ratio at which the overall bitrate is distributed among carousels of each PID.

Module rate ratio denotes the ratio at which the PID rate ratio for a carousel is distributed among the modules of the carousel.

The instruction information storage unit 306 stores the overall output bitrate, the PID rate ratio and the module rate ratio input by the operator. Hereinafter the overall output bitrate, the PID rate ratio and the module rate ratio are collectively referred to as instruction information.

FIG. 15 is a table showing one example of instruction information. An overall output bitrate column 1510 shows the overall output bitrate of content data. A PID column 1520 shows the PID of each carousel that composes the content data. A PID rate ratio column 1530 shows the PID rate ratio distributed to each PID. A module ID column 1540 shows the module ID of each module that composes each carousel. A module rate ratio column 1550 shows the module rate ratio distributed to the module of each module ID.

The data structure ratio determination unit 104 sets the PID multiplex count and the PID multiplex accumulated count for each PID and the module multiplex count and the module multiplex accumulated count for each module ID, based on the PID rate ratio and the module rate ratio notified by the data output rate instruction unit 303.

Specifically, the data structure ratio determination unit 104 sets the PID multiplex count for each PID so that the ratio of the PID multiplex count of each PID is an inverse ratio of the PID rate ratio. Then, the data structure ratio determination unit 104 calculates the PID multiplex accumulated count for each PID based on the set PID multiplex count.

Furthermore, the data structure ratio determination unit 104 sets the module multiplex count for each module ID so that the ratio of the module multiplex count of each module ID is an inverse ratio of the module rate ratio. Then, the data structure ratio determination unit 104 calculates the module multiplex accumulated count for each module ID based on the set module multiplex count.

Note that the PID multiplex accumulated count and the module multiplex accumulated count are calculated the same way as in the first embodiment.

Furthermore, the operations of the data structure ratio determination unit 104 in the output target PID and output target section determination process are the same as those in the first embodiment, thus a description thereof is omitted here.

Accordingly, the content data packets belonging to the carousels and the modules are written to the memory, and output from the memory by the data output unit 105 distributed according to the carousel structure ratio and the module structure ratio determined by the data structure ratio determination unit 104 in compliance with the PID rate ratio and the module rate ratio. Therefore, the overall output bitrate is distributed among the carousels and modules according to the carousel structure ratio and the module structure ratio determined by the data structure ratio determination unit 104 in compliance with the PID rate ratio and the module rate ratio, and the structure ratio between the carousels and the modules to be output per specified length of time is determined.

Considering the example in FIG. 15, an overall output bitrate of 2000 Kbps is distributed at a PID rate ratio of 1:2 among the carousels having the respective PIDs 100 and 101, the former being allotted 667 Kbps and the latter being allotted 1333 Kbps. The 667 Kbps bitrate allotted to the carousel having the PID 100 is further distributed at a ratio of 2:1 among the modules having respective module IDs 0 and 1 that compose the carousel, the former being allotted 445 Kbps and the latter being allotted 222 Kbps. The 1333 Kbps allotted to the carousel having the PID 101 is further distributed at a ratio of 3:1:1 among the modules having the respective module IDs 0, 1 and 2, so that the modules are allotted 800 Kbps, 266 Kbps, and 266 Kbps respectively.

In this way in the present embodiment, the output bitrate of modules and carousels that compose content data can be adjusted as desired.

Fourth Embodiment

In contrast to the data transfer apparatus 300 in the third embodiment in which instruction information is obtained by the data output rate instruction unit 303, in a data transfer apparatus 400 in the present embodiment the instruction information is obtained from a TS that is transmitted from an external apparatus.

Figure 16:
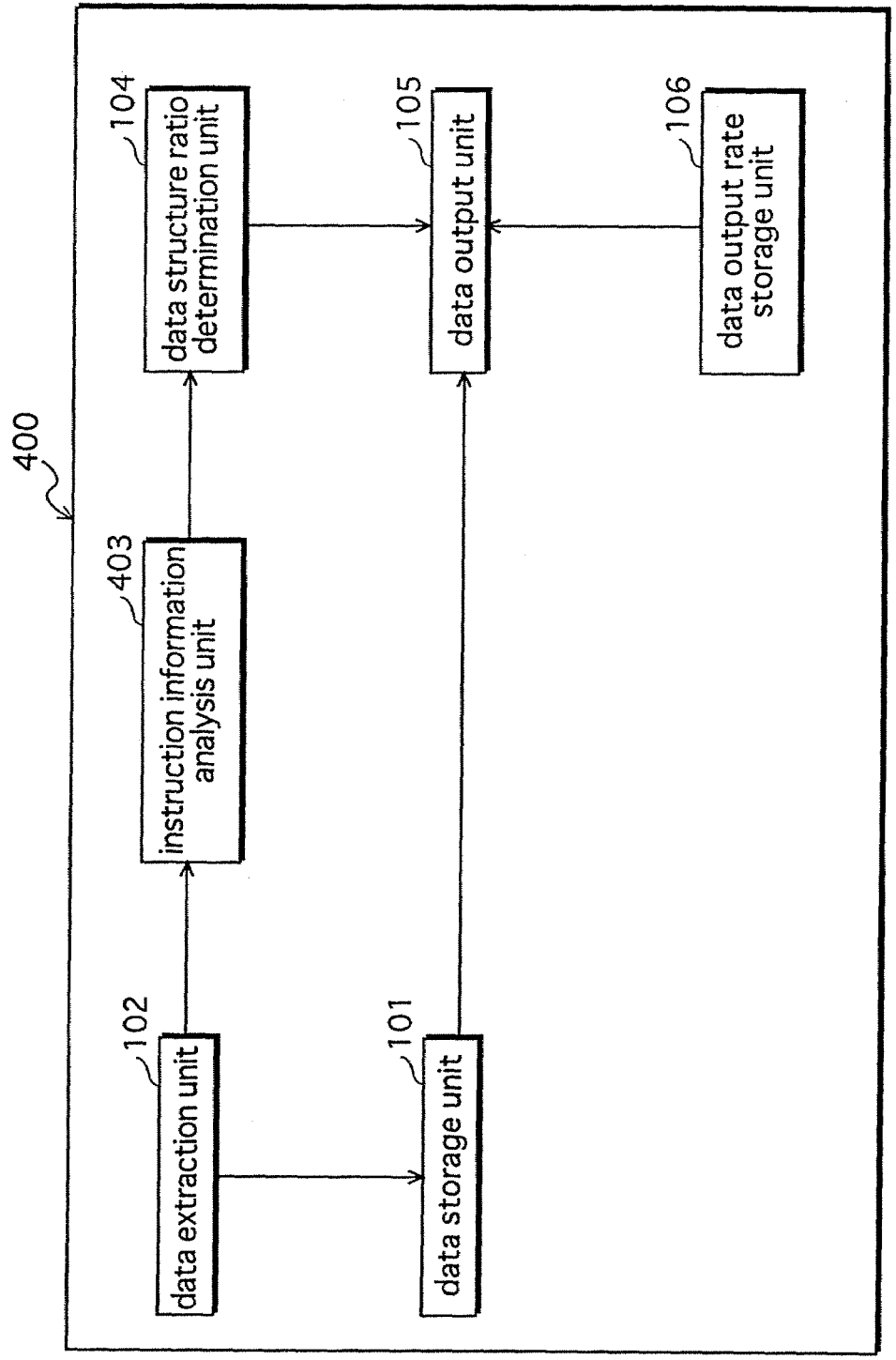
FIG. 16 shows the structure of the principal components of a data transfer apparatus 400.

FIG. 16 shows the structure of the principal components of the data transfer apparatus 400 in an embodiment of the present invention. The data transferapparatus400 is composed of the data storage unit 101, the data extraction unit 102, an instruction information analysis unit 403, the data structure ratio determination unit 104, the data output unit 105, and the data output rate storage unit 106.

Note that structural elements of the data transfer apparatus 400 that are the same as those in the data transfer apparatus 300 shown in FIG. 14 have the same numbering. The following describes the structural elements in the data transfer apparatus 400 that differ from the data transfer apparatus 300.

In the present embodiment, the instruction information is transmitted embedded in a TS as packet data to which an instruction information identifier is attached.

Since the content of the instruction information is the same as that shown in FIG. 15, a description thereof is omitted here.

The instruction information analysis unit 403 obtains the instruction information from data packets having an instruction information identifier that have been input from the data extraction unit 102, and outputs the obtained instruction information to the data structure ratio determination unit 104.

The data structure ratio determination unit 104 determines the carousel structure ratio and the module structure ratio based on the instruction information input by the instruction information analysis unit 403, determines the content data packets to be successively output in section units so as to comply with the determined carousel structure ratio and module structure ratio, and notifies each determined output target section to the data output unit 105.

Since the operations in the output target PID determination process and the output target section determination process performed by the data structure ratio determination unit 104 are the same as those in the first embodiment, a description thereof is omitted here.

Fifth Embodiment

<Structure>

Figure 17:
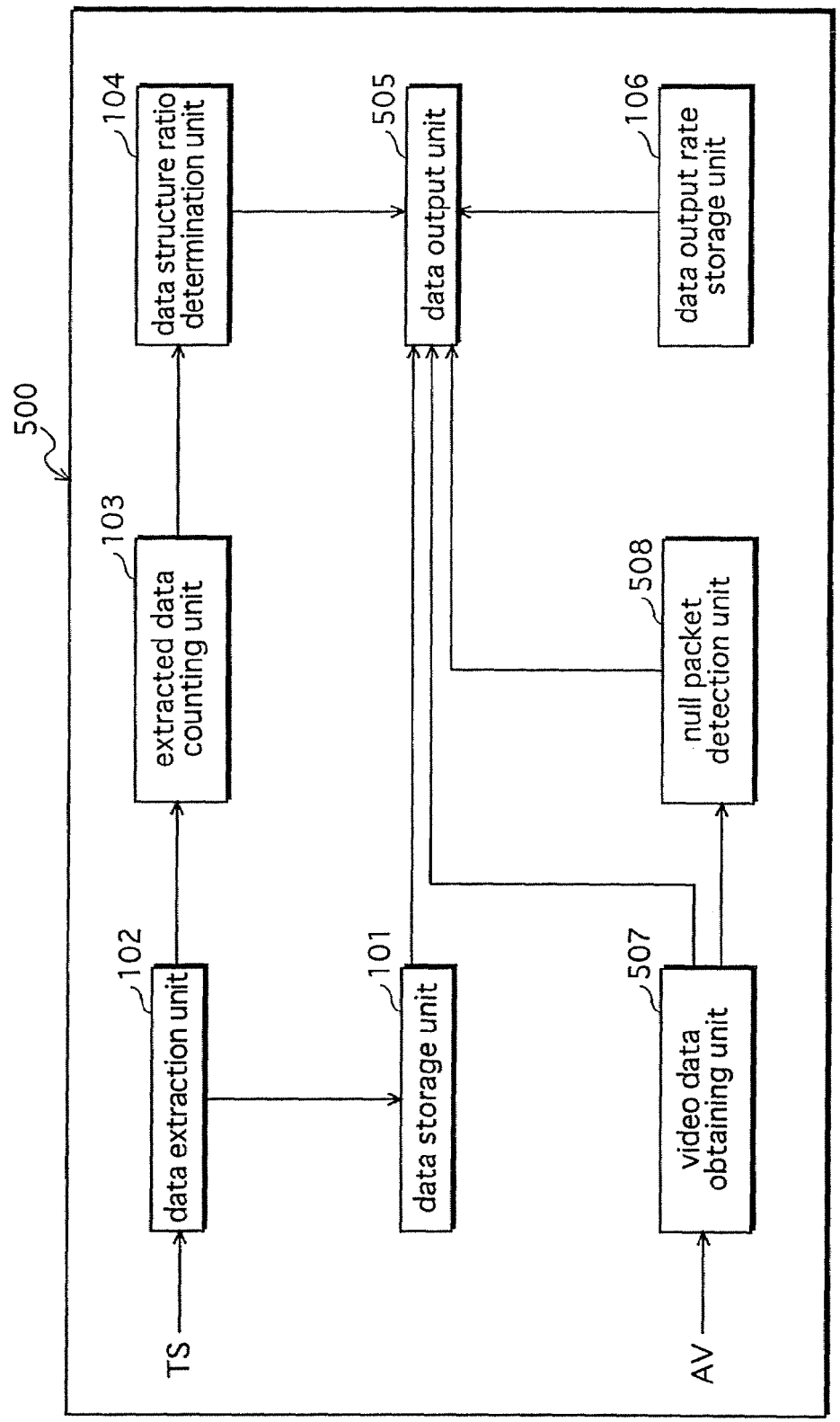
FIG. 17 shows the structure of the principal components of a data transfer apparatus 500.

FIG. 17 shows the structure of the principal components of a data transfer apparatus 500 of the present embodiment. The data transfer apparatus 500 is composed of the data storage unit 101, the data extraction unit 102, the extracted data counting unit 103, the data structure ratio determination unit 104, a data output unit 505, the data output rate storage unit 106, a video data obtaining unit 507, and a null packet detection unit 508.

Note that structural elements of the data transfer apparatus 500 that are the same as those in the data transfer apparatus 100 shown in FIG. 1 have the same numbering. The following describes the structural elements in the data transfer apparatus 500 that differ from the data transfer apparatus 100.

The video data obtaining unit 507 receives a TS transmitted from an external apparatus. Video data packets, audio data packets, and null data packets are incorporated into the TS. Hereinafter, these three types of packets are collectively referred to as AV data packets. The video data obtaining unit 507 outputs the received AV data packets to the null packet detection unit 508.

The null packet detection unit 508, on detecting a null packet in the AV data packets transmitted from the video data obtaining unit 507 by recognizing the PID attached to each null data packet, outputs a detection signal to the data output unit 505.

Here, null data packet denotes dummy packets that have a predetermined PID and that do not include data to be reproduced and displayed. Such null data packets are transmitted included in AV packet data to supplement reductions of the transmitted bitrate for the AV packet data, when the amount of AV data packets of video data transmitted varies with time, so that a predetermined bitrate for the data packets can be maintained.

The data output unit 505 performs a process for writing content data packets and a process for selecting data packets to be output.

First, the process for writing content data packets is described. As with the data output unit 105 in the first embodiment, the data output unit 505, which has a memory for storing content data packets to be output, reads content data packets of the section to be output, based on the PID, module ID, and block Number determined by the data structure ratio determination unit 104. The data output unit 505 writes the read content data packets to the memory as a queue.

Next, the process for selecting a data packet to be output is described.

The data output unit 505 select a data packet to be output, and outputs the selected data packets.

Specifically, after receiving an AV data packet from the video data obtaining unit 507, the data output unit 505 selects the AV data packet as an output target data packet when it does not detect a detection signal from the null packet detection unit 508 within a predetermined amount of time, and then outputs the selected AV data packet. When the data output unit 505 does detect a detection signal within the predetermined amount of time, it recognizes the received AV data packet as a null data packet, and instead outputs the data packet that is at the head of the queue in the memory.

As a result, the null packets in the extracted AV data packet transport stream are substituted with types of content data packets that have been successively selected according to a priority order in compliance with the carousel structure ratio and the module structure ratio determined by the data structure ratio determination unit 104.

Figure 18:
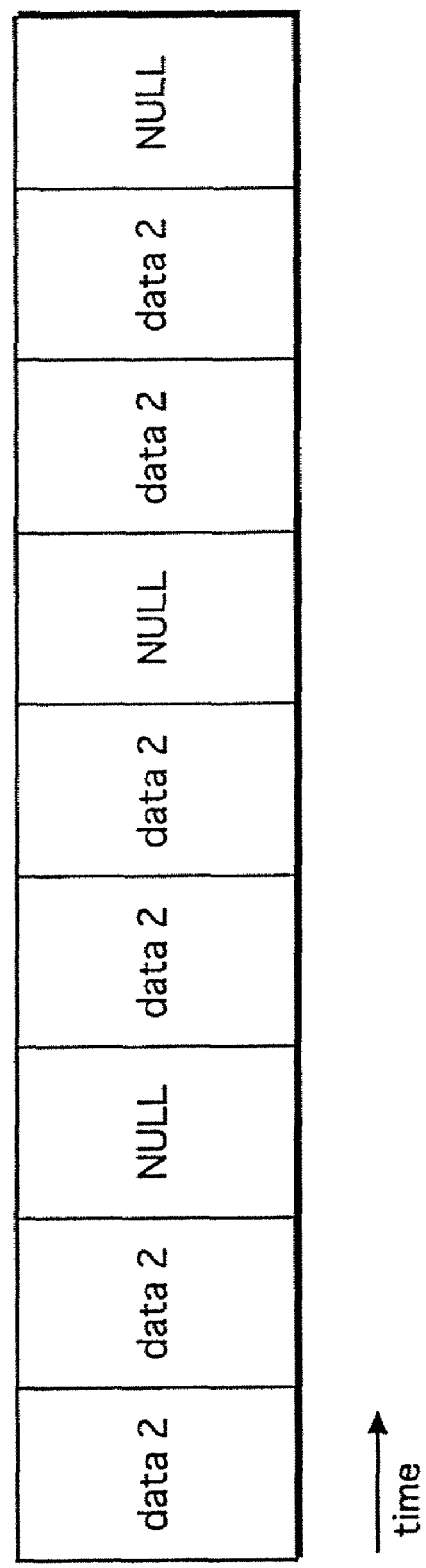
FIG. 18 shows one example of an AV data packet transport stream received by a video data obtaining unit 507.

FIG. 18 shows one example of an AV data packet transport stream received by the video data obtaining unit 507. In FIG. 18, data 2 represents AV data packets that are not null data packets, while NULL represents null data packets.

Figure 19:
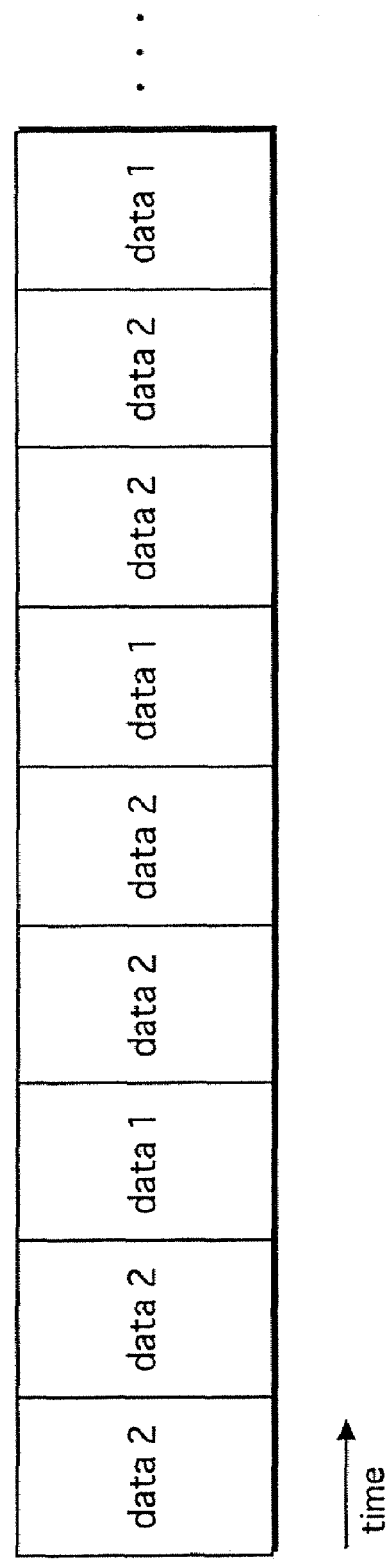
FIG. 19 shows one example of a data stream that the data output unit 505 outputs after receiving the AV data packets shown in FIG. 18 from the video data obtaining unit 507.

FIG. 19 shows one example of a data stream that the data output unit 505 outputs after receiving the AV data packets shown in FIG. 18 from the video data obtaining unit 507. Data 1 represents content data packets that the data output unit 505 has substituted for the null data packets in FIG. 18.

<Operations>

Figure 20:
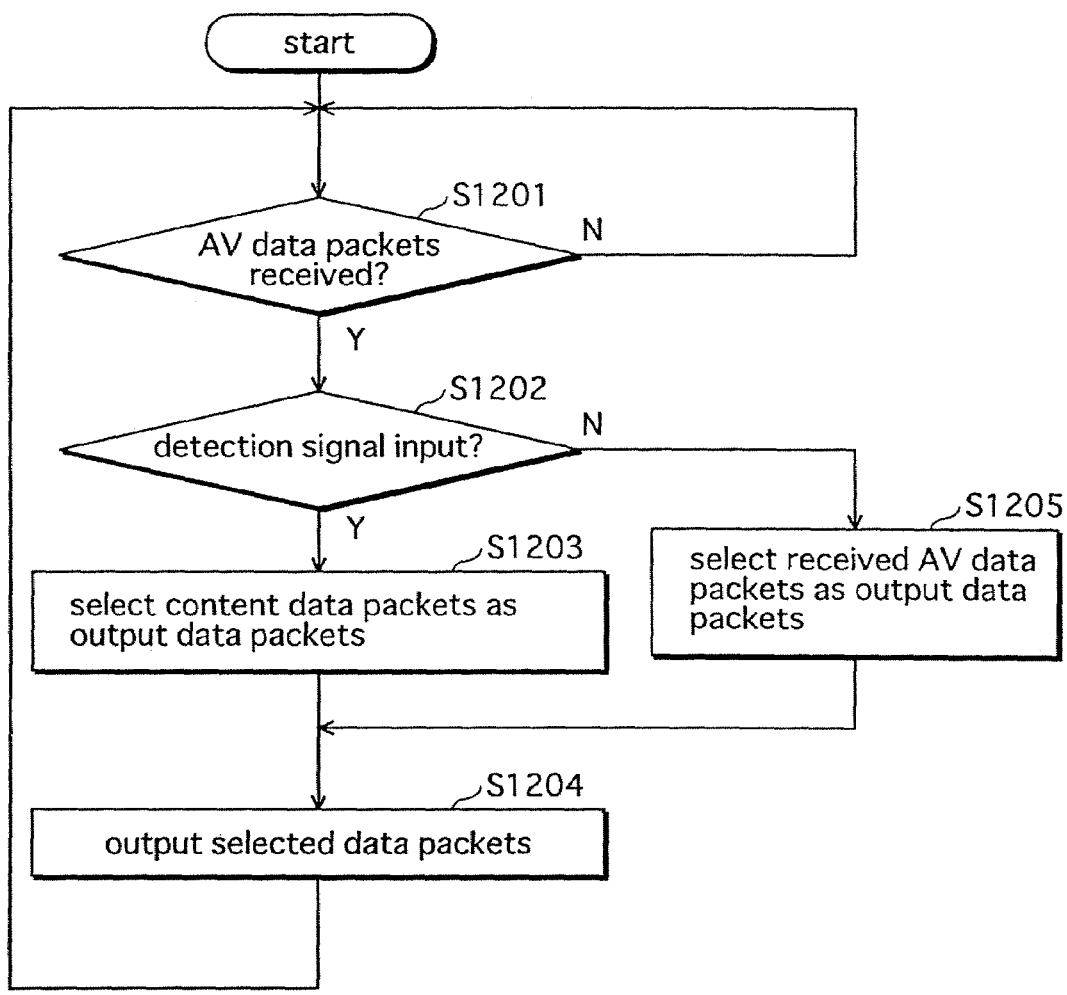
FIG. 20 is a flowchart showing the operations of the data packet selection process performed by a data output unit 505.

The following describes the operations of the data packet selection process performed by the data output unit 505, with reference to FIG. 20. FIG. 20 is a flowchart showing the operations in the data packet selection process performed by the data output unit 505.

On receiving an AV data packet from the video data obtaining unit 507 (step S1201:Y), the data output unit 505 judges whether it has received an input of a detection signal from the null packet detection unit 508 within a predetermined amount of time (step S1202).

When there is an input of a detection signal (step S1202:Y), the data output unit 505 reads the head data packet in the queue of the content data packets stored in the memory, and selects the content data packet as a data packet to be output (step S1203), and outputs the selected packet (step S1204).

When there is not an input of a detection signal (step S1202:N), the data output unit 505 selects the received AV data packet as the data packet to be output (step S1205), and outputs the selected data packet (step S1204).

Sixth Embodiment

In the data transfer apparatus 100 in the first embodiment, content data packets are output in compliance with the carousel structure ratio and the module structure ratio determined following the PID ratio and the module ratio. However, in a data transfer apparatus 600 in the present embodiment content data packets are output in compliance with a pre-set data structure ratio.

<Structure>

Figure 21:
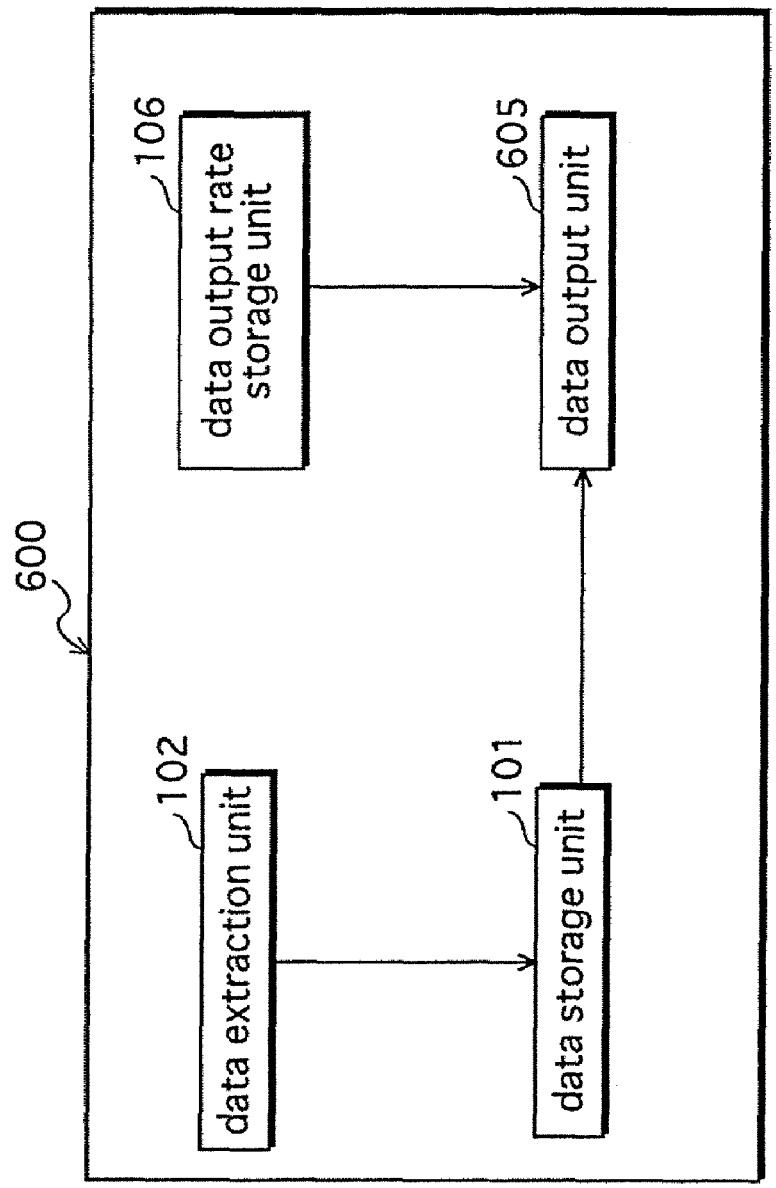
FIG. 21 shows the structure of the principal components of a data transfer apparatus 600.

FIG. 21 shows the structure of the principal components of the data transfer apparatus 600 of the present embodiment. The data transfer apparatus 600 is composed of the data storage unit 101, the data extraction unit 102, a data output unit 605, and a data output rate storage unit 106.

Note that structural elements of the data transfer apparatus 600 that are the same as those in the data transfer apparatus 100 shown in FIG. 1 have the same numbering. The following describes the structural elements in the data transfer apparatus 600 that differ from the data transfer apparatus 100.

The data output unit 605 performs a process for determining the data structure ratio of the content data packets to be output, and a process for outputting the content data packets.

First, the data structure ratio determination process is described. The data output unit 605 determines content data packets to be output in order of the numbers shown by the PIDs, module IDs and block Numbers of the content data packets (for example, the content data packets in FIG. 4 are in the order 421, 422, 423), and writes the determined content data packets order as a queue in the memory of the data output unit 605. As a result the data structure ratio of the content data packets of each PID and module ID is determined.

Next, the content data packet output process is described.

The data output unit 605 outputs the content data packets that are written in its memory in order at the overall output bitrate stored in the data output rate storage unit 106.

<Operations>

The following describes the operations of the data structure ratio determination process performed by the data output unit 605.

Figure 22:
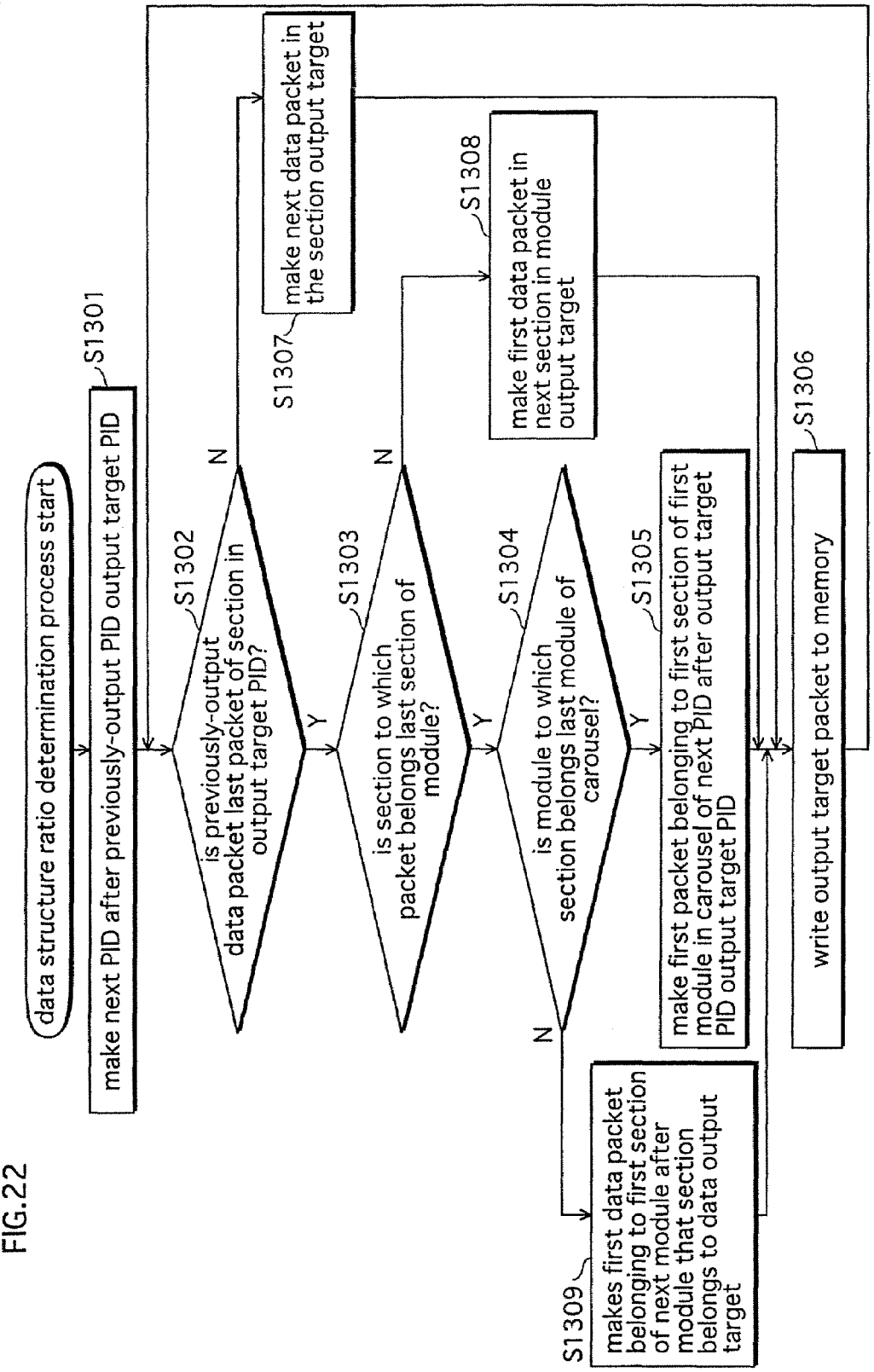
FIG. 22 is a flowchart showing operations of a data structure ratio determination process.

FIG. 22 is a flowchart showing the operations of the data structure ratio determination process performed by the data output unit 605.

The data output unit 605 makes the next PID after the PID of the previously-notified content data packet the output target PID (step S1301). Here, if the data structure ratio determination process has just started and there is no previously-notified content data packet, the data output unit 605 makes the first PID the output target PID.

Furthermore, the data output unit 605 judges whether the previously-output content data packet is the last content data packet in the section (step S1302). This judgement can be made, for example, by referring to a flag appended to the last content data packet showing that it is the last content data packet.

When the content data packet is the last one (step S1302: Y), the data output unit 605 judges whether the section is the last section in the module (step S1303). This judgement can be made, for example, by comparing the number of sections in the module to which the section belongs and the section number showing the number of the section in the module, which are shown in header information included in the head content data packet of each section.

When the section is the last section (step S1303:Y), the data output unit 605 judges whether the module to which the section belongs is the last module in the particular carousel (step S1304). This judgement may be made, for example, by storing the module ID of the last module of each carousel of each PID in the data storage unit 101, and having the data output unit 605 compare the last module ID among the stored module IDs and the module ID of the module to which the section belongs. Alternatively, the last module ID may be incorporated in DII (DownloadInfoIndication) in the carousel of each PID, and the data output unit 605 may be judged based on the last module ID described in the DII stored in the data storage unit 101, which has been extracted by the data extraction unit 102.

If the module is the last module (step S1304:Y), the data output unit 605 makes the first content data packet belonging to the first section of the first module in the carousel of the next PID after the output target PID the output target data packet (step S1305), and writes the output target data packet to the memory (step S1306).

When the content data packet is not the last one (step S1302:N), the data output unit 605 makes the next content data packet in the section the output target data packet (step S1307) and writes the content data packet to the memory (step S1306).

When the section is not the last section (step S1303:N), the data output unit 605 makes the first content data packet in the next section in the module after the section the output target data packet (step S1308), and writes the content data packet to the memory (step S1306).

When the module is not the last module (step S1304:Y), the data output unit 605 makes the first content data packet belonging to the first section of the next module in the carousel the output target data packet (step S1309), and writes the content data packet to the memory (step S1306).

Note that in the above-described processing output target data packets are determined in order from the head data packet in the carousel of each PID, however the method is not limited to this. For example, a priority order may be determined with each module, and the determination processing of the content data packets performed in this priority order. Alternatively, a priority order may be determined with each carousel, and the content data packets processed in this priority order. Furthermore, it is also possible to perform the output target packet determination process so that the content data packets of sections having different PIDs are mixed together.

Modifications

The present invention is not limited to the above-described embodiments. The following is some examples of possible modifications.

(1) In the first embodiment the data output unit 105 outputs the content data packets written in the memory at the overall output bitrate stored in the data output rate storage unit 106. However, it is possible to vary the overall output bitrate for outputting the content data packets over time. Specifically, input of a new overall output bitrate into the data output rate storage unit 106 by the operator when necessary enables the data output unit 105 to output content data packets at an overall output bitrate that varies over time. It is also possible to store a plurality of overall bitrates in correspondence in the data output rate storage unit 106 with time information showing time slots in which each overall output bitrate is used. The data output unit 105 selects the corresponding overall output bitrate based on the time information, and outputs at that bitrate.

Accordingly, content data packets can be output at a desired bitrate corresponding to time, in compliance with the carousel structure ratio and the module structure ratio determined by the data structure ratio determination unit 104.

(2) In the first embodiment, the data structure ratio determination unit 104 determines the carousel structure ratio and the module structure ratio based on the number of data packets input for each module ID by the extracted data counting unit 103. However, the carousel structure ratio and the module structure ratio may instead be determined based on a distribution ratio of the overall output bitrate for each PID and module ID that is determined in advance.

(3) In the first embodiment, the data structure ratio determination unit 104 determines the carousel structure ratio and the module structure ratio based on the number of data packets input for each module ID by the extracted data counting unit 103. However, it is possible instead to determine these following a preset bitrate for a portion of content data packets (for example, the group of content data packets having the PID 101 in the first embodiment).

(4) In the third and fourth embodiments, the data structure ratio determination unit 104 sets the PID multiplex count and the module multiplex count based on the PID rate ratio and the module rate ratio. However, it is possible to set only the PID multiplex count based on the PID rate ratio, and, as in the first embodiment, set the module multiplex count based on a module rate calculated based on the number of input data packets for each module in a carousel. In this case, the functions of the data structure ratio determination unit 104 can be achieved by adding the extracted data counting unit 103 to the constituent elements of the data transfer apparatuses 300 and 400.

Similarly, it is possible to set only the module multiplex count based on the module rate ratio, and, as in the first embodiment, set the PID multiplex count based on a PID ratio calculated based on the number of input data packets for each carousel.

(5) In the third embodiment, it is possible to allocate a content data packet output bitrate for calculating the PID rate ratio and the module rate ratio for each PID and each module ID, instead of using a PID rate ratio and a module rate ratio. In this case, the data structure ratio determination unit 104 calculates the PID rate ratio and the module rate ratio based on the output bitrate allocated for the carousel and module of each PID and each module ID, and performs the same kind of processing as that in the third embodiment.

In the above-described example, it is possible to allocate an output bitrate to content data packets of a portion of carousels, instead of using the PID rate ratio and the module rate ratio. In this case, an output rate that is the allocated output bitrate subtracted from the overall output bitrate is distributed among the carousel and modules of each module ID and each bitrate, in correspondence with a ratio showing the PID rate ratio and the module rate ratio.

(6) In the third embodiment two parameters, i.e. the PID rate ratio and the module rate ratio, are used for distributing the overall bitrate, however it is also possible to use only the module rate ratio. In this case, the overall output bitrate is distributed among the modules of each module ID in correspondence with the ratio showing the module rate ratio.

In the above-described case it is possible to allocate an output bitrate for calculating the module rate ratio for the module of each module ID, instead of using the module rate ratio. In this case, the data structure ratio determination unit 104 calculates the module rate ratio based on the output bitrate allocated to the module of each module ID, and performs the same kind of processing as in the above-described case.

In the above-described case, an output bitrate may be allocated to some modules instead of using the module rate ratio. In this case, an output bitrate that is the allocated bitrate subtracted from the overall output bitrate is distributed among the module IDs according to the ratio shown by the module rate ratio.

(7) In the third embodiment, if content data packets having a module ID for which a module rate ratio has not been set are extracted, the content data packets may be distributed at a predetermined bitrate. Taking the example in FIG. 15, if the content data packets in the module having the module ID 2 not having a module rate ratio are extracted, a predetermined module rate ratio (for example, 1) may be allocated to the module.

(8) In the third embodiment, if data packets whose module ID has a set module rate ratio are not extracted, a predetermined module rate ratio of another module ID may be allocated. Taking the example in FIG. 15, if only the content data packets of the module IDs 0 and 1 among the modules having PIDs are 101 are detected, the module ID set for the module having the PID is 2 may be ignored, and the output bitrate distributed among the modules having the module IDs 0 and 1 at a module rate ratio of 3:1.

(9) In the third and fourth embodiments, the overall output bitrate may be divided in advance into two output bitrates: a minimum output bitrate and a surplus output bitrate. Here, the minimum bitrate is distributed among the carousels, and the surplus bitrate is re-distributed, based on the PID rate ratio and the module rate ratio, among each PID, carousel of each module ID, and each module, which are given an priority order. The ratio at which the output bitrate is distributed may be a fixed ratio set in advance, or may be varied with time by an operator.

(10) In the third and fourth embodiments, the PID rate ratio, the module rate ratio, and the overall output bitrate may be varied with time by the operator.

(11) In the fifth embodiment, the null data packets incorporated in the extracted AV data packet stream are replaced with content data packets determined by the data structure ratio determination unit 104 and output, however the data packets that are replaced are not limited to being null data packets. Other AV data packets having specified a PID may be replaced, as may a plurality of types of AV data packets.

(12) In the fifth embodiment, instead of replacing data packets, data packets having a specified PID may be detected and the PID rewritten to another predetermined PID before being output. The above-described functions may be realized, for example, by adding the following functions to the following units in the data transfer apparatus 500. The null packet detection unit 508 notifies the data output unit 505 with a detection signal on detecting the specified PID. The data storage unit 101 stores the predetermined PID that is to be used to overwrite the specified PID. The data output unit 505, on receiving the notification with the detection signal from the null packet detection unit 508, reads the predetermined PID from the data output rate storage unit 106, overwrites the PID of the data packets detected as having the specified PID with the predetermined PID, and outputs the data packets whose PID has been overwritten.

(13) In the first to the fourth embodiments, when the output target PID notified by the data structure ratio determination unit 104 is a specified PID, the data output unit 105 may re-write the PID of the content data packets included in the output target section belonging to the specified PID with a predetermined PID, write the resulting content data packets to the memory, and output the written content data packets. This function can be achieved, for example, in the following way. The data storage unit 101 has an added function of storing in correspondence a re-write target PID for identifying the PID that is re-written and a re-write PID for specifying the PID that is used to re-write. The data output unit 105 has the added functions of, each time notification of an output target PID is received from the data structure ratio determination unit 104, judging whether the notified PID matches the re-write target PID, and when it does match, reading the re-write PID that corresponds to the re-write target PID, and re-writing the PID of each content data packet with the read re-write PID. Note that there may be a plurality of re-write target PIDs and PIDs used to re-write. In this case, the data storage unit 101 stores each re-write target PID in correspondence with a PID used to re-write.

(14) In the first to fourth and sixth embodiments, the data transfer apparatus may store extracted content data each time the content data is updated.

The above-described function may be realized by incorporating update information in each content data packet showing that the content data has been updated. Here the update information is, for example, a flag or a version number. The data extraction unit 102 judges, based on the update information of an extracted data packet, whether the content data packet has been updated, and if content data packet has been updated, has the content data packet stored in the data storage unit 101. Note that the content data packets may be updated in module units or in carousel units.

Furthermore, instead of incorporating update information in each content data packet, update information may be incorporated in the DII in each carousel, and the data extraction unit 102 may be made to judge whether the content data packet has been updated by referring to the update information in the extracted DII.

(15) In the first to the fifth embodiments, the determination process for output target data packets is performed in section units, put this process may be performed for each content data packet.

In this case, the output target PID determination process (step S2007) is the same as the process shown in FIG. 10, other than step S1007 which is replaced with step S2007. Here, a description of the steps other than step S2007 is omitted. The following describes the output target data packet process performed by the data structure ratio determination unit 104 at step S2007.

Figure 23:
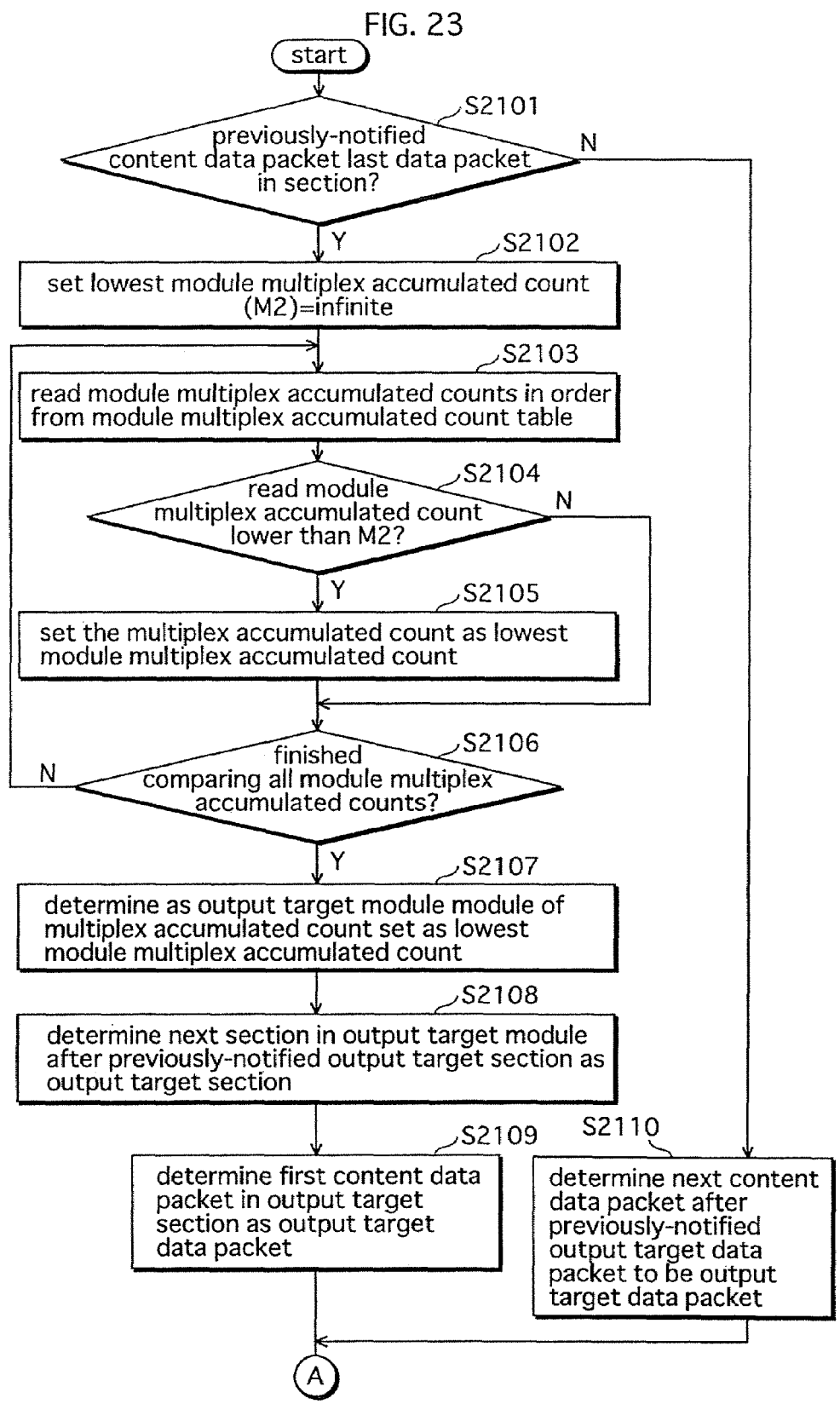
FIG. 23 is a flowchart showing the former part of an output target data packet determination process performed by the data structure ratio determination unit 104.
Figure 24:
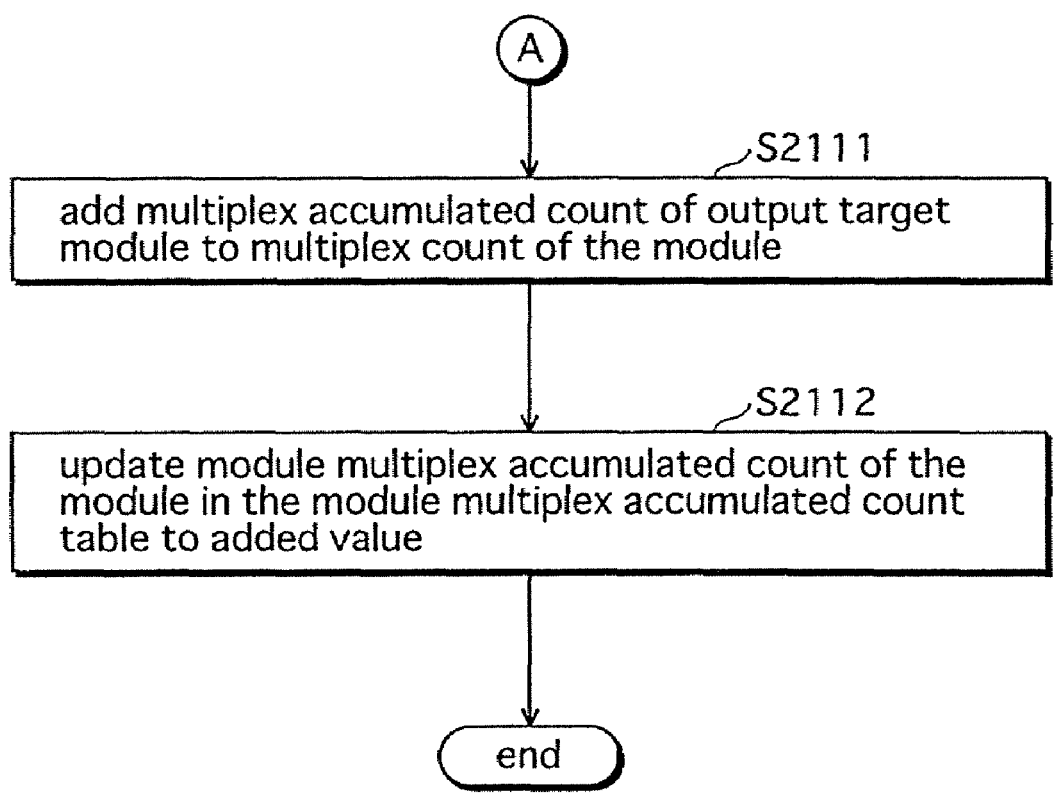
FIG. 24 is a flowchart showing the latter part of the output target data packet determination process performed by the data structure ratio determination unit 104.

FIGS. 23 and 24 are flowcharts showing the output target packet determination process performed by the data structure ratio determination unit 104. The determination process is described with use of FIGS. 23 and 24.

After determining the output target PID at step S1006, the data structure ratio determination unit 104 judges whether, in the content data packets of the output target PID, the previously-notified content data packet is the last data packet in the particular section (step S2101).

If the content data packet is the last data packet (step S2101:Y), the data structure ratio determination unit 104 sets the lowest module multiplex accumulated count (M2) showing the lowest the module multiplex accumulated count value to infinite, which is the initial value (step S2102). Then, the data structure ratio determination unit 104 reads the module multiplex accumulated counts in order from the module multiplex accumulated count table(step S2103), and compares each read module multiplex accumulated count to M2 (step S2104).

When a module multiplex accumulated is lower than M2 (step S2104:Y), the data structure ratio determination unit 104 sets that module multiplex accumulated count as the lowest module multiplex accumulated count (M2) (step S2105), and judges whether all the read module multiplex accumulated counts have been compared to M2 (step S2106).

When all have been compared (step S2106:Y), the data structure ratio determination unit 104 selects the module showing the module multiplex accumulated count value set as the lowest module multiplex accumulated count (M2) as the output target module (step S2107). Then, by referring to the information in the management information table, the data structure ratio determination unit 104 selects the next section in the selected output target module after the previously-notified section as the output target section. Here, if there is no previously-notified section, or if the previously-notified section is the last section, the data structure ratio determination unit 104 selects the first section in the output target module (step S2108). The data structure ratio determination unit 104 selects the first content data packet in the output target section as the output target data packet (step S2109). Then, the data structure ratio determination unit 104 notifies the data output unit 105 of the selected output target data packet, and adds the module multiplex count value of the output target module to the module multiplex accumulated count of that module (step S2111), and updates the module multiplex accumulated count of that module in the module multiplex accumulated count table with the value obtained at step S2111 (step S2112).

At step S2101, if the content data packet is not the last data packet (step S2102:N), the data structure ratio determination unit 104 selects the next content data packet among the content data packets that belong to output target module after the previously-notified content data packet as the output target data packet (step S2110), notifies the data output unit 105, and adds the module multiplex count value of the output target module to the module multiplex accumulated count of that module (step S2111). Then, the data structure ratio determination unit 104 updates the module multiplex accumulated count of that module in the module multiplex accumulated count with the value obtained at step S2111 (step S2112), and performs the same processing as at step S1008 in FIG. 10.

At step S2104, when the module multiplex accumulated is not lower than M2 (step S2104:N), the data structure ratio determination unit 104 performs the processing at step S2106.

At step S2106, when all the read module multiplex accumulated counts have not been compared to M2 (step S2106:N), the data structure ratio determination unit 104 repeats the processing from step S2103 to step S2106.

Note that in the above-described processing, the content data packet output process performed by the data output unit 105 after receiving notification of the selected output target data packet is the same as the processing shown in FIG. 25, except that the processing at step S2401 is instead processing for reading the notified output target data packet, and the processing as step S2404 is instead processing for writing the read output target data packet to the memory.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

The invention claimed is:

1. A data transfer apparatus that receives from an upper station a data stream that includes a plurality of types of repeat data, each type of repeat data being repeatedly transmitted according to a carousel transmission method by the upper station and repeat data of a same type being identical in content, and transfers the repeat data to a lower station, comprising:

storage means having a storage area;

extraction means for extracting the types of repeat data from the received data stream;

writing means for writing the extracted repeat data to the storage area;

data structure ratio determination means for determining a ratio between the types of repeat data to be output in a data stream per fixed length of time; and data output means for outputting the repeat data at the determined ratio by reading and outputting each type of repeat data a number of times that corresponds to the determined ratio, wherein each of the plurality of types of repeat data is composed of a plurality of data packets, each of a same size, the data structure ratio determination means includes:

a counting unit for counting, for each type of repeat data, the number of data packets extracted over a predetermined length of time, and the data structure ratio determination means determines a ratio between the number of data packets counted for each type of repeat data as the ratio between the types of repeat data to be output over a fixed length of time.

2. The data transfer apparatus of claim 1, wherein the data stream further includes output information data that includes output ratio information showing a ratio between the types of repeat data output by the upper station, the extraction means further extracts the output information data, and the data structure ratio determination means determines the ratio based on the output ratio information included in the extracted output information data.

3. The data transfer apparatus of claim 1,
wherein the output means includes:
an output rate instruction information reception unit for receiving a instruction information for instructing an overall output bitrate and a ratio between the types of repeat data in a data stream output per specified unit of time,
the data structure ratio determination means includes:
an instruction information storage unit that has a recording area in which the instruction information is recorded; and
an instruction information recording unit for recording the received instruction information in the recording area,
the data structure ratio determination means determines the ratio based on the recorded instruction information, and
the output means outputs the repeat data stored in the storage means at the overall bitrate shown by the instruction information.

4. The data transfer apparatus of claim 1,
wherein the data stream further includes instruction information data that has (a) instruction information for instructing a ratio between the types of repeat data that are included in a data stream to be output per fixed length of time and (b) an overall output bitrate,
the extraction means further extracts the instruction information data from the data stream,
the data structure ratio determination means determines the ratio based on the instruction information included in the extracted instruction information data,
and the output means outputs the repeat data stored in the storage means at the overall bitrate shown by the instruction information.

5. The data transfer apparatus of claim 4 wherein,
the output means outputs the types of repeat data at a bitrate which is the ratio determined by the data structure ratio determination means multiplied by the overall bitrate.

6. The data transfer apparatus of claim 1,
wherein each type of repeat data is composed of a plurality of data packets that are transmitted according to a carousel transmission method, and
the data stream is a transport stream.

7. A data transfer method used in a data transfer apparatus of claim 1 that (a) receives from an upper station a data stream that includes a plurality of types of repeat data, each type of repeat data being repeatedly transmitted according to a carousel transmission method by the upper station and repeat data of a same type being identical in content, (b) transfers the repeat data to a lower station, and (c) has a storage area, the method comprising:
an extraction step for extracting the types of repeat data from the received data stream;
a writing step for writing the extracted repeat data to the storage area;
a data structure ratio determination step for determining a ratio between the types of repeat data to be output in a data stream per fixed length of time; and
a data output step for outputting the repeat data at the determined ratio by reading and outputting each type of repeat data a number of times that corresponds to the determined ratio.

8. A computer readable medium encoded with a computer program that causes a data transfer apparatus as claimed in claim 1 to execute data transfer processing, the data transfer apparatus (a) receiving from an upper station a data stream that includes a plurality of types of repeat data, each type of repeat data being repeatedly transmitted according to a carousel transmission method by the upper station and repeat data of a same type being identical in content, (b) transferring the repeat data to a lower station, and (c) having a storage area, the data transfer processing comprising:
an extraction step for extracting the types of repeat data from the received data stream;
a writing step for writing the extracted repeat data to the storage area;
a data structure ratio determination step for determining a ratio between the types of repeat data to be output in a data stream per fixed length of time; and
a data output step for outputting the repeat data at the determined ratio by reading and outputting each type of repeat data a number of times that corresponds to the determined ratio.

9. The data transfer apparatus of claim 1 wherein the counting unit outputs a table including the total of the number of packet data pieces counted for each module ID of the modules belonging to the repeat data corresponding to each module ID and each PID, and the data structure ratio determination means determines the module ratio and the repeat data ratio using the table.

10. The data transfer apparatus of claim 1 wherein the data output means for outputting the repeat data at the determined ratio by repeatedly analyzing a number of packet data output for each type of repeat data.

11. The data transfer apparatus of claim 1 wherein the counting unit is a means for counting the number of data packets extracted for each repeat data over a predetermined length of time and outputting the number of data packets extracted for each repeat data over the predetermined length of time to the data structure ratio determination means.

12. A data transfer apparatus that receives from an upper station a data stream that includes pieces of repeat data that are repeatedly transmitted according to a carousel transmission method by the upper station and that are identical in content, and transfers the received repeat data to a lower station, each piece of repeat data being updated at a predetermined interval and including update information showing that the updated piece of repeat data has been updated, comprising:
storage means having a storage area for storing one piece of the repeat data;
extraction means for successively extracting the pieces of repeat data from the received data stream;
update judgment means for judging, based on the update information, whether the extracted piece of repeat data has been updated;
writing means for writing a first extracted piece of repeat data to the storage area, and, only when one of the extracted pieces of repeat data is judged to have been updated, replacing the updated piece of repeat data with the piece of repeat data stored in the storage means; and
output means for repeatedly reading the piece of repeat data stored in the storage means, and repeatedly outputting the read piece of repeat data.

13. The data transfer apparatus of claim 1, wherein
the data steam is a transport stream,
each type of the repeat data is composed of a plurality of types of modules,
each module is composed of a plurality of packet data pieces,
each packet data piece includes a PID and a module ID, the PID being an identifier that identifies the type of the repeat data to which the packet data belongs, and the module ID being an identifier that identifies the type of the module to which the packet data belongs, the extraction means extracts each type of repeat data in module units, the storage means stores each extracted modules in the storage area, the counting unit counts, for each type of repeat data, the number of packet data pieces that include the module ID of each module that composes the repeat data extracted over the predetermined length of time, the data structure ratio determination means determines, for each type of repeat data, a ratio between the types of modules belonging to the repeat data, according to a module ratio that is a ratio between the number of packet data pieces counted for the corresponding module ID of each type of module, and determines a repeat data ratio for each type of repeat data extracted over the predetermined length of time, according to a PID ratio that is a ratio between a total of the number of packet data pieces counted for each module ID of the modules belonging to the repeat data, and the data output means outputs each type of repeat data by making a number of reads of the stored repeat data that corresponds to the determined PID ratio, and further outputs each type of module composing the repeat data by making a number of reads of the stored module that corresponds to the determined module ratio.

* * * * *

UNITED STATES PATENT AND TRADEMARK OFFICE
CERTIFICATE OF CORRECTION

PATENT NO. : 7,463,586 B2
APPLICATION NO. : 11/768801
DATED : December 9, 2008
INVENTOR(S) : Tanaka et al.

It is certified that error appears in the above-identified patent and that said Letters Patent is hereby corrected as shown below:

In the Claims:
In Claim 1, Column 26, line 50-51, "same size" should be --same data size--
In Claim 3, Column 27, line 7, "a instruction" should be --an instruction--

Signed and Sealed this

Twenty-fourth Day of February, 2009

JOHN DOLL
*Acting Director of the United States Patent and Trademark Office*